US012492978B2

(12) United States Patent
Nakamura et al.

(10) Patent No.: US 12,492,978 B2
(45) Date of Patent: Dec. 9, 2025

(54) OPTICAL MEASUREMENT DEVICE

(71) Applicant: FUJIFILM Corporation, Tokyo (JP)

(72) Inventors: Sohichiro Nakamura, Kanagawa (JP); Kenichi Hamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 104 days.

(21) Appl. No.: 18/361,895

(22) Filed: Jul. 30, 2023

(65) Prior Publication Data

US 2023/0375453 A1     Nov. 23, 2023

Related U.S. Application Data

(63) Continuation of application No. PCT/JP2022/000845, filed on Jan. 13, 2022.

(30) Foreign Application Priority Data

Feb. 2, 2021    (JP) ................... 2021-015309

(51) Int. Cl.
     *G01N 15/0205*      (2024.01)

(52) U.S. Cl.
     CPC ................ *G01N 15/0205* (2013.01)

(58) Field of Classification Search
     CPC .......... G01N 15/0211; G01N 15/0205; G01N 2015/0222; G01N 21/51; G01N 15/1459;
(Continued)

(56) References Cited

U.S. PATENT DOCUMENTS 6,738,144 B1 * 5/2004 Dogariu ............ G01B 9/02007
                                                                356/497
9,857,283 B1 * 1/2018 Tatarkiewicz ..... G01N 15/1433
(Continued)

FOREIGN PATENT DOCUMENTS

CN      106248532 A   *   12/2016
CN      109883930 A   *   6/2019
(Continued)

OTHER PUBLICATIONS

"Office Action of Korea Counterpart Application", issued on Oct. 31, 2024, with English translation thereof, p. 1-p. 17.
(Continued)

*Primary Examiner* — Michael P Stafira
(74) *Attorney, Agent, or Firm* — JCIPRNET

(57) ABSTRACT

Provided is an optical measurement device capable of easily measuring a scattering intensity at different scattering angles or different wavelengths. An optical measurement device with a low-coherence interferometer includes a detection unit having at least one of a first detection unit that detects an interference light intensity per wavelength by means of interference between at least a part of scattered light obtained by allowing incident light to be incident on a dispersion liquid including particles and reference light or a second detection unit that detects an interference light intensity per scattering angle by means of interference between at least a part of the scattered light obtained by allowing the incident light to be incident on the dispersion liquid including the particles and the reference light, and a conversion unit extracts a scattering intensity at a specific depth and a specific wavelength of the dispersion liquid from data of the interference light intensity per wavelength detected by the first detection unit or a scattering intensity at a specific depth and a specific scattering angle of the dispersion liquid from data of the interference light intensity per scattering angle detected by the second detection unit and converts data of the extracted scattering intensity into time fluctuation data of the scattered light at the specific depth of the dispersion liquid.

19 Claims, 18 Drawing Sheets

(58) Field of Classification Search
CPC ....... G01N 33/6803; G01N 2015/1497; G01N 2015/0038; G01N 2015/1493; G01N 21/6428; G01N 33/54346; G01N 15/01; G01N 2015/1486; G01N 15/1433; G01N 21/6486; G01N 33/68; G01N 2015/025; G01N 2015/0053; G01N 2015/0092; G01N 2015/019; G01N 2021/0346; G01N 21/0303; G01N 33/582; G01N 2015/03; G01N 21/47; G01N 15/14; G01N 33/542; G01N 33/573; G01N 21/45; G01N 33/533; G01N 2021/4707; G01N 21/53; G01N 33/551; G01N 2015/0046; G01N 2021/6432; G01N 33/54313; G01N 2021/0389; G01N 2021/4709; G01N 21/49; G01N 21/85; G01N 2201/062; G01N 33/4833; G01N 33/5308; G01N 33/5436; G01N 33/552; G01N 33/574; G01N 33/587; G01N 33/60; G01N 11/02; G01N 2011/008; G01N 15/00; G01N 15/075; G01N 2201/06113; G01N 2201/068; G01N 2201/12; G01N 2333/9015; G01N 11/00; G01N 15/042; G01N 2015/0233; G01N 2015/1454; G01N 21/474; G01N 33/588; G01N 15/0227; G01N 15/1429; G01N 15/1434; G01N 2015/0294; G01N 2015/1445; G01N 2021/1734; G01N 2021/4726; G01N 2021/4769; G01N 2021/513; G01N 2021/6421; G01N 2021/6439; G01N 2035/00326; G01N 2035/1051; G01N 21/33; G01N 21/6458; G01N 21/84; G01N 21/94; G01N 23/201; G01N 23/207; G01N 2333/485; G01N 2333/71; G01N 2333/765; G01N 2333/79; G01N 2600/00; G01N 35/00; G01N 35/1065; G01N 15/02; G01N 15/147; G01N 15/1484; G01N 2015/003; G01N 2015/1006; G01N 2015/1027; G01N 21/31; G01N 2500/10; G01N 2800/52; G01N 33/483; G01N 33/5011; G01N 33/54326; G01N 33/54388; G01N 33/6848

See application file for complete search history.

(56) References Cited

U.S. PATENT DOCUMENTS

| 10,627,288 | B1 * | 4/2020 | Liphardt | G01N 21/211 |
| 2008/0285032 | A1 | 11/2008 | Ohkubo | |
| 2011/0181869 | A1 | 7/2011 | Yamaguchi et al. | |
| 2015/0369733 | A1 * | 12/2015 | Izutani | G01N 21/0303 356/338 |
| 2016/0202164 | A1 * | 7/2016 | Trainer | G01N 15/0211 356/336 |
| 2019/0246906 | A1 * | 8/2019 | Nakamura | G01N 21/4795 |
| 2022/0205899 | A1 | 6/2022 | Yamane et al. | |

FOREIGN PATENT DOCUMENTS

| DE | 102008029479 | A1 * | 12/2009 | G01B 9/02097 |
| JP | 2008039539 | | 2/2008 | |
| JP | 2011013162 | A * | 1/2011 | G01J 3/4412 |
| JP | 2013205145 | | 10/2013 | |
| JP | 2013205145 | A * | 10/2013 | |
| JP | 2016006397 | | 1/2016 | |
| JP | 6745349 | B2 * | 8/2020 | A61B 5/00 |
| JP | 2020193877 | | 12/2020 | |
| WO | 2004042371 | | 5/2004 | |
| WO | 2010035775 | | 4/2010 | |
| WO | WO-2018079326 | A1 * | 5/2018 | A61B 5/00 |

OTHER PUBLICATIONS

"International Search Report (Form PCT/ISA/210) of PCT/JP2022/000845", mailed on Apr. 5, 2022, with English translation thereof, pp. 1-5.
"Written Opinion of the International Searching Authority (Form PCT/ISA/237) of PCT/JP2022/000845", mailed on Apr. 5, 2022, with English translation thereof, pp. 1-8.
"Search Report of Europe Counterpart Application", issued on Jul. 17, 2024, p. 1-p. 10.
"Notice of Final Rejection of Korea Counterpart Application", with English translation thereof, issued on Jul. 30, 2025, pp. 1-8.
"Office Action of Europe Counterpart Application", issued on Jul. 21, 2025, pp. 1-9.

* cited by examiner

OPTICAL MEASUREMENT DEVICE

CROSS-REFERENCE TO RELATED APPLICATIONS

This application is a Continuation of PCT International Application No. PCT/JP2022/000845 filed on Jan. 13, 2022, which claims priority under 35 U.S.C. § 119(a) to Japanese Patent Application No. 2021-015309 filed on Feb. 2, 2021. The above applications are hereby expressly incorporated by reference, in their entirety, into the present application.

BACKGROUND OF THE INVENTION

1. Field of the Invention

The present invention relates to an optical measurement device that measures scattering intensity of a dispersion liquid including particles at different scattering angles or different wavelengths.

2. Description of the Related Art

There is known a dynamic light scattering measurement method that checks dynamic characteristics of scatterers by applying light to a medium, such as a suspension, and detecting a time variation of a scattered light intensity scattered from the scatterers in the medium using an autocorrelation function or a power spectrum. The dynamic light scattering measurement method has been widely used in various kinds of measurement, such as particle diameter measurement.

For example, JP2008-39539A describes a light scattering detection device that detects fine particles in a liquid or gaseous sample, the light scattering detection device comprising a transparent sample cell that holds the sample, a first light source unit that emits static light scattering measurement light having a first wavelength or a first wavelength range, a second light source unit that emits dynamic light scattering measurement light having a second wavelength or a second wavelength range different from the first wavelength or the first wavelength range, a first detection unit including a plurality of detectors disposed to surround the sample cell and configured to selectively detect the first wavelength or the first wavelength range to detect light scattered at different scattering angles from the sample cell to surroundings under the irradiation with the static light scattering measurement light, a second detection unit including a one or a plurality of detectors disposed around the sample cell and configured to selectively detect the second wavelength or the second wavelength range to detect light scattered at different scattering angles from the sample cell to surroundings under the irradiation with the dynamic light scattering measurement light, and a calculation processing unit that, when the sample cell is irradiated with the static light scattering measurement light by the first light source unit and the dynamic light scattering measurement light by the second light source unit simultaneously, receives a detection signal by the first detection unit and a detection signal by the second detection unit, executes calculation by a static light scattering method based on the former detection signal, and executes calculation by a dynamic light scattering method based on the latter detection signal.

SUMMARY OF THE INVENTION

In JP2008-39539A, two light source units of the first light source unit and the second light source unit having different wavelength or wavelength ranges are prepared, and the sample cell is irradiated with emitted light from the light source units simultaneously in a coaxial or non-coaxial manner. To irradiate both luminous fluxes in a coaxial manner, for example, a light combination unit that introduces irradiated light by the first light source unit and irradiated light by the second light source unit to the sample cell along the same optical path needs to be further provided. Tn JP2008-39539A, a plurality of light sources and detectors are required, and a device configuration is large-scaled. From this viewpoint, it is disadvantageous to increase the number of measurement wavelengths or to improve the resolution of the scattering angle. In addition, effort to adjust an optical axis is required by the number of detectors and light sources to detect scattered light generated from the same part of the sample. In a suspension that causes multiple scattering, since a signal scattered multiple times by particles is detected, measurement cannot be performed. In JP2008-39539A, there is difficulty in easily measuring a scattering intensity of a dispersion liquid or a suspension including particles at different scattering angles or different wavelengths.

An object of the present invention is to provide an optical measurement device capable of easily measuring a scattering intensity at different scattering angles or different wavelengths.

To attain the above-described object, there is provided an optical measurement device according to an aspect of the present invention comprising a low-coherence interferometer, a detection unit having at least one of a first detection unit that detects an interference light intensity per wavelength by means of interference between at least a part of scattered light obtained by allowing incident light to be incident on a dispersion liquid including particles and reference light or a second detection unit that detects an interference light intensity per scattering angle by means of interference between at least a part of the scattered light obtained by allowing the incident light to be incident on the dispersion liquid including the particles and the reference light, and a conversion unit that extracts a plurality of pieces of data of a scattering intensity at a specific depth and a specific wavelength of the dispersion liquid from data of the interference light intensity per wavelength detected by the first detection unit or a plurality of pieces of data of a scattering intensity at a specific depth and a specific scattering angle of the dispersion liquid from data of the interference light intensity per scattering angle detected by the second detection unit and converts the extracted data of the scattering intensity into time fluctuation data of the scattered light at the specific depth of the dispersion liquid.

It is preferable that the optical measurement device further comprises a calculation unit that calculates a particle diameter of the particles using the time fluctuation data acquired by the conversion unit.

It is preferable that the optical measurement device further comprises a calculation unit that obtains a particle size distribution of each type of particle included in the dispersion liquid by fitting the time fluctuation data acquired by the conversion unit and time averaged data obtained by time averaging the time fluctuation data acquired by the conversion unit with respect to a theoretical formula that defines a relationship between a particle diameter and a scattering intensity.

It is preferable that the optical measurement device further comprises a storage unit that stores at least one of scattering angle-dependent data regarding a scattered light intensity of known particles, which is obtained by a complex refractive index, a particle diameter, and a shape of the known particles, or wavelength-dependent data regarding the scattered light intensity, and a calculation unit that obtains a particle size distribution of each type of particle included in the dispersion liquid by fitting scattering angle-dependent data obtained from the time fluctuation data acquired by the conversion unit or wavelength-dependent data of the scattered light obtained from the time fluctuation data acquired by the conversion unit with respect to the scattering angle-dependent data regarding the scattered light intensity or the wavelength-dependent data regarding the scattered light intensity of the known particles stored in the storage unit.

It is preferable that the optical measurement device further comprises a storage unit that stores at least one of scattering angle-dependent data regarding a scattered light intensity of known particles, which is obtained by a complex refractive index, a particle diameter, and a shape of the known particles, or wavelength-dependent data regarding the scattered light intensity, and a calculation unit that determines at least one of a particle of the particles in the dispersion liquid or a state of the particles in the dispersion liquid using the scattering angle-dependent data regarding the scattered light intensity or the wavelength-dependent data regarding the scattered light intensity of the known particles stored in the storage unit.

It is preferable that the first detection unit has a photodetector that wavelength-resolves the scattered light that has interfered with the reference light and detects the wavelength-resolved scattered light for each wavelength.

It is preferable that the second detection unit has a photodetector that detects the scattered light that has interfered with the reference light for each scattering angle.

It is preferable that the optical measurement device further comprises a polarization control unit that controls a polarization state of the incident light, in which the first detection unit or the second detection unit measures a light intensity of a polarized component of the scattered light as the scattering intensity.

It is preferable that the optical measurement device further comprises a spectral adjustment unit that controls a center wavelength and a wavelength range of the incident light.

For example, the time fluctuation data of the scattered light is a power spectrum or an autocorrelation function.

According to the present invention, it is possible to provide an optical measurement device capable of easily measuring a scattering intensity at different scattering angles or different wavelengths.

DESCRIPTION OF THE PREFERRED EMBODIMENTS

Hereinafter, an optical measurement device of the present invention will be described in detail based on a preferred embodiment shown in the accompanying drawings.

The drawings described below are exemplary for describing the present invention, and the present invention is not limited to the drawings described below.

Hereinafter, the expression "to" indicating a numerical range includes numerical values described on both sides. For example, $\varepsilon$ is a numerical value $\varepsilon_\beta$, to a numerical value $\varepsilon_\beta$ means that a range of $\varepsilon$ is a range including the numerical value $\varepsilon_\beta$ and the numerical value $\varepsilon_\beta$, and is represented as $\varepsilon_\beta \leq \varepsilon \varepsilon_\beta$ by mathematical signs.

Angles, such as "angles represented by specific numerical values" and "parallel", include error ranges generally tolerated in the technique field unless specifically described.

First Example of Optical Measurement Device

Figure 1:
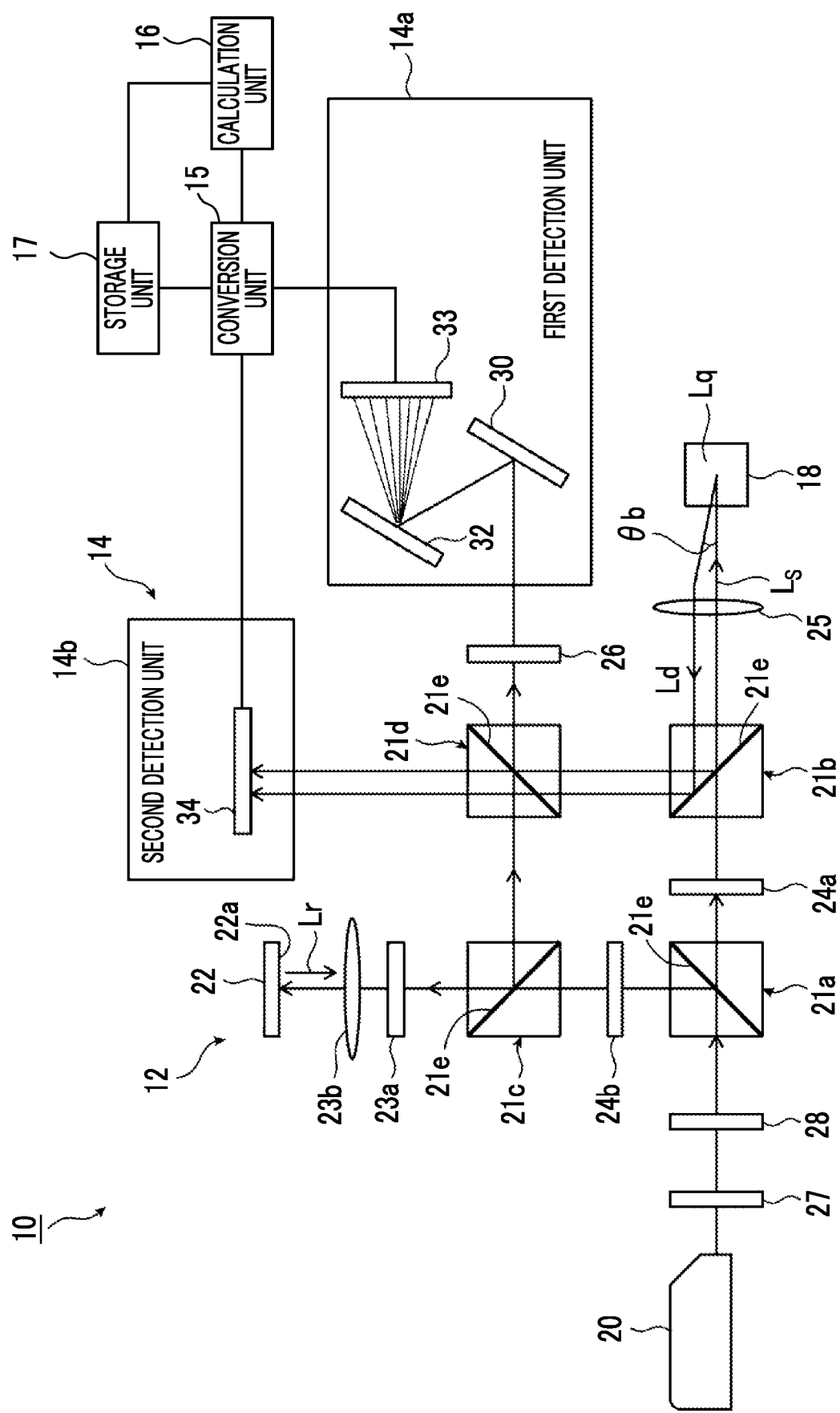
FIG. 1 is a schematic view showing a first example of an optical measurement device of an embodiment of the present invention.

FIG. 1 is a schematic view showing a first example of an optical measurement device of the embodiment of the present invention.

An optical measurement device 10 shown in FIG. 1 has a low-coherence interferometer 12, a detection unit 14 having a first detection unit 14a and a second detection unit 14b, a conversion unit 15, a calculation unit 16, and a storage unit 17. The optical measurement device 10 has a sample cell 18.

The low-coherence interferometer 12 is an optical interferometer using a light source that emits low-coherence light, as a light source.

The low-coherence interferometer 12 has, for example, a light source unit 20, and four beam splitters 21a, 21b, 21c, and 21d. Each of the four beam splitters 21a, 21b, 21c, 21d has a transmitting and reflecting surface 21e that splits incident light into two kinds of light or multiplexes two kinds of incident light. The transmitting and reflecting surface 21e is an inclined surface that is inclined at an angle of 45°.

The four beam splitters 21a, 21b, 21c, and 21d are regular hexahedron-shaped cube type beam splitters. A form of the beam splitter is not limited to a cube type, and may be a flat plate-shaped plate type.

The low-coherence interferometer 12 is not limited to the configuration shown in FIG. 1.

The four beam splitters 21a, 21b, 21c, and 21d are disposed at respective apexes of a quadrangle. The beam splitter 21a and the beam splitter 21d disposed on a diagonal line have the transmitting and reflecting surfaces 21e parallel to each other. The beam splitter 21b and the beam splitter 21c disposed on a diagonal line have the transmitting and reflecting surfaces 21e parallel to each other. The transmitting and reflecting surfaces 21e of the four beam splitters 21a, 21b, 21c, and 21d are different in direction from and nonparallel, specifically, anti-parallel to the transmitting and reflecting surfaces 21e of adjacent beam splitters 21a, 21b, 21c, and 21d.

The beam splitter 21a and the beam splitter 21c are disposed in parallel, and a reflector 22 is disposed on the opposite side of the beam splitter 21c from the beam splitter 21a. A dispersion compensation adjustment unit 23a and an objective lens 23b are disposed between the beam splitter 21c and the reflector 22 from the beam splitter 21c side.

The reflector 22 reflects incident light, and a reflecting surface 22a of the reflector 22 is a reference surface. The reflector 22 is not particularly limited as long as incident light can be reflected, and for example, a mirror or a glass plate is used.

The dispersion compensation adjustment unit 23a compensates for group velocity dispersion by the sample cell 18.

In a case where the sample cell 18 is configured with an optical glass as described below, the dispersion compensation adjustment unit 23a compensates for group velocity dispersion depending on a thickness of the optical glass configuring the sample cell 18. A configuration is made in which a glass plate having a thickness comparable to the optical glass configuring the sample cell 18 is disposed between the beam splitter 21c and the objective lens 23b to compensate for group velocity dispersion of light being transmitted therethrough. That is, the dispersion compensation adjustment unit 23a adjusts an optical path length difference depending on a difference in wavelength of reference light Lr, and fits the optical path lengths per wavelength of the reference light Lr and scattered light Ld.

The objective lens 23b condenses light incident on the reflector 22 to the reflecting surface 22a of the reflector 22.

The beam splitter 21a and the beam splitter 21b are disposed in parallel, and a neutral density (ND) filter 24a is disposed between the beam splitter 21a and the beam splitter 21b. An ND filter 24b is disposed between the beam splitter 21a and the beam splitter 21c.

The ND filters 24a and 24b adjusts a light amount to balance light intensities of the reference light Lr reflected by the reflecting surface 22a of the reflector 22 and the scattered light Ld from the sample cell 18. As the ND filters 24a and 24b, known ND filters can be suitably used.

The sample cell 18 is disposed on the opposite side of the beam splitter 21b from the beam splitter 21a. An objective lens 25 that condenses incident light Ls to the sample cell 18 is disposed between the beam splitter 21b and the sample cell 18.

The beam splitter 21c and the beam splitter 21d are disposed in parallel, and the first detection unit 14a is disposed on the opposite side of the beam splitter 21d from the beam splitter 21c. A polarization adjustment unit 26 is disposed between the beam splitter 21d and the first detection unit 14a.

The polarization adjustment unit 26 controls a polarization state of scattered light that is emitted from the beam splitter 21d and is incident on the first detection unit 14a. The polarization adjustment unit 26 is configured with, for example, a polarizing element, and the polarizing element is suitably used to adjust the polarization state of the scattered light Ld scattered from a dispersion liquid Lq of the sample cell 18, such as circularly polarized light, linearly polarized light, or elliptically polarized light. More specifically, for example, the polarization adjustment unit 26 is configured with a polarizer. Measurement may be performed while changing a direction of a transmission axis of the polarizer in plurality.

The beam splitter 21b and the beam splitter 21d are disposed in parallel, and the second detection unit 14b is disposed on the opposite side of the beam splitter 21d from the beam splitter 21b.

The first detection unit 14a has a mirror 30, and a diffraction grating 32 on which reflected light reflected from the mirror 30 is incident. The diffraction grating 32 is an optical element that wavelength-resolves incident light including scattered light and splits incident light into light of respective wavelengths. Scattered light per wavelength can be obtained by the diffraction grating 32.

The first detection unit 14a further has a photodetector 33 on which diffracted light generated by diffraction of scattered light in the diffraction grating 32 according to the wavelength is incident. Scattered light wavelength-resolved by the photodetector 33 is detected for each wavelength. As the photodetector 33, for example, a line camera in which a photoelectric conversion element is disposed on a straight line is used. The photodetector 33 may be a photodetector in which a photomultiplier tube is disposed, instead of a line camera.

While the photodetector 33 of the first detection unit 14a receives diffracted light including scattered light diffracted by the diffraction grating 32, a diffraction angle is different for each wavelength, and a position where the line camera as the photodetector 33 receives light is determined. For this reason, in the first detection unit 14a, a wavelength is specified depending on the position where the line camera as the photodetector 33 receives light. In this manner, the first detection unit 14a wavelength-resolves scattered light to detect wavelength-resolved scattered light for wavelength. With this, it is possible to easily measure a scattering intensity of scattered light at different wavelengths.

While the diffraction grating 32 is used to obtain light of respective wavelengths, the present invention is not limited to the diffraction grating 32 as long as light of respective wavelengths can be obtained. For example, a plurality of band-pass filters having different cutoff wavelength ranges may be prepared, and the band-pass filters may be replaced to obtain scattered light per wavelength. A prism may be used, instead of the diffraction grating 32.

The second detection unit 14b has a photodetector 34. The photodetector 34 detects scattered light for each scattering angle. As the photodetector 34, for example, a line camera in which a photoelectric conversion element is disposed on a straight line is used. In the second detection unit 14b, the scattering angle is specified depending on a position where the line camera as the photodetector 34 receives light. With this, it is possible to easily measure a scattering intensity of scattered light at different scattering angles. The photodetector 34 also detects an interference light intensity per scattering angle regarding interference light obtained by means of interference between scattered light and reference light.

The photodetector 34 may be a high-speed camera, instead of the line camera.

The photoelectric conversion element that is used in the photodetectors 33 and 34 is, for example, a photodiode.

The sample cell 18 is, for example, a rectangular parallelepiped or columnar container formed of optical glass or optical plastic. The dispersion liquid Lq as a measurement target including particles is stored in the sample cell 18. The dispersion liquid Lq is irradiated with the incident light Ls.

The sample cell 18 may be disposed in an immersion bath (not shown). The immersion bath is provided to eliminate a refractive index difference between the sample cell 18 and an ambient environment, and a known immersion bath can be suitably used. The sample cell 18 may bring into contact with metal in contact with a Peltier element to adjust the temperature of the sample cell 18.

The light source unit 20 is disposed on the opposite side of the beam splitter 21a from the beam splitter 21b. The light source unit 20 irradiates the sample cell 18 with the incident light Ls, and allows emitted light to be incident on the beam splitter 21a.

The light source unit 20 emits low-coherence light as the incident light Ls. Low-coherence light is light with a bandwidth, unlike monochromic laser light. As the light source unit 20, for example, a Xenon lamp, a super-luminescence diode (SLD), a light emitting diode (LED), or a super-continuum (SC) light source is used.

A spectral adjustment unit 27 and a polarization control unit 28 are provided between the light source unit 20 and the beam splitter 21a from the light source unit 20 side.

The spectral adjustment unit 27 cuts an unnecessary wavelength range according to a spectrum of the incident light Ls by the light source unit 20. For example, in a case where a near infrared light region in the super-continuum light source cannot be detected in the photodetector 33 of the first detection unit 14a and the photodetector 34 of the second detection unit 14b, as the spectral adjustment unit 27, for example, a filter that cuts a near infrared light region is used.

In measuring a scattering intensity for each scattering angle in the second detection unit 14b, for the purpose of limiting a wavelength range, as the spectral adjustment unit 27, for example, a band-pass filter may be used.

In a case of measuring scattered light of the dispersion liquid Lq using light having a plurality of wavelengths, it is also considered that a plurality of light sources having different emission wavelengths are prepared as the light source unit 20. Note that, since a wavelength range can be cut with the use of the band-pass filter as the spectral adjustment unit 27, it is possible to simplify the configuration of the light source unit 20 and to simplify the device configuration.

The polarization control unit 28 controls a polarization state of incident light, and adjusts polarization of incident light. The polarization control unit 28 is configured with, for example, a polarizing element, and a polarizing element according to polarized light with which the sample cell 18 is irradiated, such as circularly polarized light, linearly polarized light, or elliptically polarized light, is suitably used. In determining a shape of the particles, polarized light is used as incident light. More specifically, the polarization control unit 28 is configured with a combination of a polarizer and a $\lambda/4$ plate. With this, the unpolarized incident light Ls can be converted into circularly polarized light.

In the optical measurement device 10, in a case where polarization of light emitted from the light source unit 20 is used without change, the polarization adjustment unit 26 and the polarization control unit 28 are not always required.

In the optical measurement device 10 having the first detection unit 14a and the second detection unit 14b, it is possible to easily measure a scattering intensity at different scattering angles or different wavelengths.

In the optical measurement device 10, in a case where any one of the scattering angle or the wavelength is used, in the detection unit 14, any one of the first detection unit 14a or the second detection unit 14b may be provided.

Light emitted from the light source unit 20 is split by the transmitting and reflecting surface 21e of the beam splitter 21a, is transmitted through the transmitting and reflecting surface 21e and is incident on the beam splitter 21b, and is transmitted through the transmitting and reflecting surface 21e of the beam splitter 21b, and the sample cell 18 is irradiated with light as the incident light Ls. The scattered light Ld generated by scattering of the incident light Ls in the dispersion liquid Lq of the sample cell 18 is reflected to the beam splitter 21d by the transmitting and reflecting surface 21e of the beam splitter 21b.

Out of light emitted from the light source unit 20, the scattered light Ld reflected by the transmitting and reflecting surface 21e of the beam splitter 21d is incident on the first detection unit 14a.

Light that is split by the transmitting and reflecting surface 21e of the beam splitter 21a and is incident on the beam splitter 21c is transmitted through the transmitting and reflecting surface 21e, is incident on the reflector 22, and is reflected by the reflecting surface 22a of the reflector 22. The reflected light is the reference light Lr. The reference light Lr is reflected by the transmitting and reflecting surface 21e of the beam splitter 21c and is incident on the beam splitter 21d. The reference light Lr transmitted through the transmitting and reflecting surface 21e of the beam splitter 21d is incident on the first detection unit 14a. In this way, the scattered light Ld and the reference light Lr are incident on the first detection unit 14a and interfere with each other. At least a part of the scattered light Ld and the reference light Lr may interfere with each other, and it is preferable that the optical path length is adjusted to make only the scattered light Ld generated at a specific depth of the dispersion liquid Lq interfere with the reference light Lr.

In the first detection unit 14a, the light receiving position of the photodetector 33 is determined for each wavelength by the diffraction grating 32, interference light can be detected for each wavelength, and data of an interference light intensity per wavelength is obtained. With this, in the conversion unit 15, data of a scattering intensity at a specific depth and a specific wavelength of the dispersion liquid Lq can be obtained from an interference spectrum of scattered light. It may be considered that the depth indicates an optical path length at which scattered light passes through the dispersion liquid Lq.

The scattered light Ld is transmitted through the transmitting and reflecting surface 21e of the beam splitter 21d and is incident on the second detection unit 14b.

Out of the reference light Lr, the reference light Lr reflected by the transmitting and reflecting surface 21e of the beam splitter 21d is incident on the second detection unit 14b. In this way, the scattered light Ld and the reference light Lr are incident on the second detection unit 14b and interfere with each other. At least a part of the scattered light Ld and the reference light Lr may interfere with each other, and it is preferable that the optical path length is adjusted to make only scattered light generated at a specific depth of the dispersion liquid Lq interfere with the reference light Lr.

A reflection position of the scattered light Ld in the transmitting and reflecting surface 21e of the beam splitter 21b is different, and the light receiving position in the photodetector 34 is also different, depending on a scattering angle θb of the dispersion liquid Lq. For this reason, in the second detection unit 14b, the light receiving position of the photodetector 34 is determined for each scattering angle, and interference light between reference light and scattered light can be detected for each scattering angle, and data of an interference light intensity is obtained per scattering angle.

With this, in the conversion unit 15, in regard to scattered light at a specific depth of the dispersion liquid Lq corresponding to the same optical path length as reference light, data of a scattering intensity at a specific scattering angle can be obtained from data of the interference light intensity per scattering angle. The scattering angle θb (°) of the FIG. 1 is an angle with backward scattered light at a scattering angle of 180° as a reference. General notation of the scattering angle θ(°) with an angle of forward scattering as 0° has a relationship of θ(°)=180°−θb (°).

The calculation unit 16 is connected to the conversion unit 15, and the storage unit 17 is connected to the conversion unit 15 and the calculation unit 16.

The conversion unit 15 extracts a plurality of scattering intensities or a plurality of values proportional to an electric field of scattered light at a specific wavelength from data of the interference light intensity detected by the first detection unit 14a or a plurality of scattering intensities or a plurality of values proportional to an electric field of light at a specific scattering angle from data of the interference light intensity detected by the second detection unit 14b. Then, the conversion unit 15 converts extracted data of the scattering intensity into time fluctuation data of scattered light at a specific depth of the dispersion liquid Lq.

The conversion unit 15 is connected to the photodetector 33 of the first detection unit 14a and the photodetector 34 of the second detection unit 14b. The conversion unit 15 acquires data of a light intensity at a specific wavelength, detected by the photodetector 33 of the first detection unit 14a and extracts a plurality of pieces of data of the scattering intensity at the specific wavelength. Then, the conversion unit 15 converts extracted data of the scattering intensity into time fluctuation data of scattered light at the specific depth of the dispersion liquid Lq.

The conversion unit 15 allows interference with only scattered light detected by the photodetector 34 of the second detection unit 14b and generated at the specific depth of the dispersion liquid Lq through position control of the reflector 22, acquires data of an intensity of interference light at a specific scattering angle, and extracts a plurality of scattering intensities at the specific scattering angle. With this, the conversion unit 15 converts data of the extracted scattering intensity into time fluctuation data of scattered light at the specific depth of the dispersion liquid Lq. The time fluctuation data is a power spectrum or an autocorrelation function.

The scattered light of the dispersion liquid Lq described above includes components of light scattered at various depths of the dispersion liquid Lq, and the components of light are different in the number of times of scattering and are also different in intensity. For accurate measurement of a particle diameter or the like of the particles, it is necessary to perform analysis using scattered light at the specific depth of the dispersion liquid Lq. The specific depth of the dispersion liquid Lq is set, whereby, for example, single scattered light generated by scattering of light by one degree, out of scattered light can be obtained.

In the conversion unit 15, analysis of converting data of the extracted scattering intensity into the time fluctuation data of scattered light at the specific depth of the dispersion liquid Lq will be described below.

A program (computer software) stored in a read only memory (ROM) or the like is executed by the conversion unit 15, whereby the conversion unit 15 extracts a plurality of scattering intensities and converts data of the extracted scattering intensity into the time fluctuation data of scattered light at the specific depth of the dispersion liquid Lq as described above. The conversion unit 15 may be configured with a computer in which the program is executed as described above, so that each part functions, may be a dedicated device in which each part is configured with a dedicated circuit, or may be a server as being executed on a cloud.

The calculation unit 16 calculates the particle diameter of the particles using the time fluctuation data acquired by the conversion unit 15.

The calculation unit 16 obtains a particle size distribution of each type of particle included in the dispersion liquid by fitting the time fluctuation data acquired by the conversion unit 15 and time averaged data obtained by time averaging the time fluctuation data acquired by the conversion unit 15 with respect to a theoretical formula that defines a relationship between the particle diameter and the scattering intensity. In the calculation of the particle diameter of the particles in the calculation unit 16, various calculation methods that are used in a dynamic light scattering method can be suitably used. A method of obtaining the particle size distribution of each type of particle included in the dispersion liquid will be described below.

The storage unit 17 stores at least one of scattering angle-dependent data regarding a scattered light intensity or a wavelength-dependent data regarding a scattered light intensity of known particles, obtained depending on a complex refractive index, a particle diameter, and a shape of the known particles.

At least one of the scattering angle-dependent data regarding the scattered light intensity or the wavelength-dependent data regarding the scattered light intensity of the known particles is stored in the storage unit 17, whereby such data can be referred to in obtaining the particle size distribution of the particles or in fitting. For this reason, it is preferable that, in regard to various particles, at least one of the scattering angle-dependent data regarding the scattered light intensity or the wavelength-dependent data regarding the scattered light intensity of known particles is stored, and a model library is constructed.

The storage unit 17 stores various kinds of data obtained by the conversion unit 15.

The storage unit 17 is not particularly limited as long as the scattering angle-dependent data regarding the scattered light intensity and the wavelength-dependent data regarding the scattered light intensity of the known particles, and various kinds of data obtained by the conversion unit 15 can be stored, and for example, various storage mediums, such as a hard disk or a solid state drive (SSD), can be used.

The calculation unit 16 performs fitting for obtaining the particle size distribution of each type of particle using at least one of the scattering angle-dependent data regarding the scattered light intensity or the wavelength-dependent data regarding the scattered light intensity of the known particles stored in the storage unit 17.

The calculation unit 16 may read out various kinds of data stored in the storage unit 17 and obtained by the conversion unit 15 and may perform fitting. An aggregation state of the particles or the type of particle may be determined by comparing the scattering characteristics of the particles stored in the model library with respect to a particle size distribution value obtained from fluctuation data of measurement and measured wavelength dependence or intensity dependence of scattered light.

The scattering characteristics are, for example, the scattering angle-dependent data regarding the scattered light intensity and the wavelength-dependent data regarding the scattered light intensity of the known particles. The scattering characteristics of the particles may be measured values obtained using the known particles, such as standard particles, or calculated values obtained by a theoretical formula that defines a relationship between the particle diameter and the scattering intensity, such as a Mie scattering theoretical formula. The scattering characteristics of the particles may be calculated values by a simulation. The calculated values by the simulation are obtained, using, for example, a finite-difference time-domain method (FDTD method) or a discrete dipole approximation (DDA) method. The scattering characteristics of the particles described above are stored in, for example, the storage unit 17 as a model library.

The calculation unit 16 executes a program (computer software) stored in the ROM or the like, whereby the calculation unit 16 calculates the particle diameter of the particles described above and obtains the particle size distribution of each type of particle included in the dispersion liquid. The calculation unit 16 may be configured with a computer in which the program is executed as described above, so that each part functions, may be a dedicated device in which each part is configured with a dedicated circuit, or may be configured with a server as being executed on a cloud.

In the optical measurement device 10, the reference light Lr may be shielded not to interfere with the scattered light. In this case, the reference light Lr is shielded, whereby normal dynamic light scattering measurement can be performed. As a method of shielding the reference light Lr, for example, there is a method in which a retractable light shielding plate is provided between the beam splitter 21a and the beam splitter 21c to prevent light split from the beam splitter 21a from reaching the reflector 22.

A retractable light shielding plate may be provided between the beam splitter 21c and the beam splitter 21d to shield the reference light Lr that reaches the beam splitter 21d, to shield the reference light Lr.

The present invention is not limited to a retractable light shielding plate as long as light can be shielded, and for example, an optical shutter using a liquid crystal shutter can be used.

With the above configuration, the optical measurement device 10 can also be used as a dynamic light scattering measurement device for normal homodyne detection.

Figure 2:
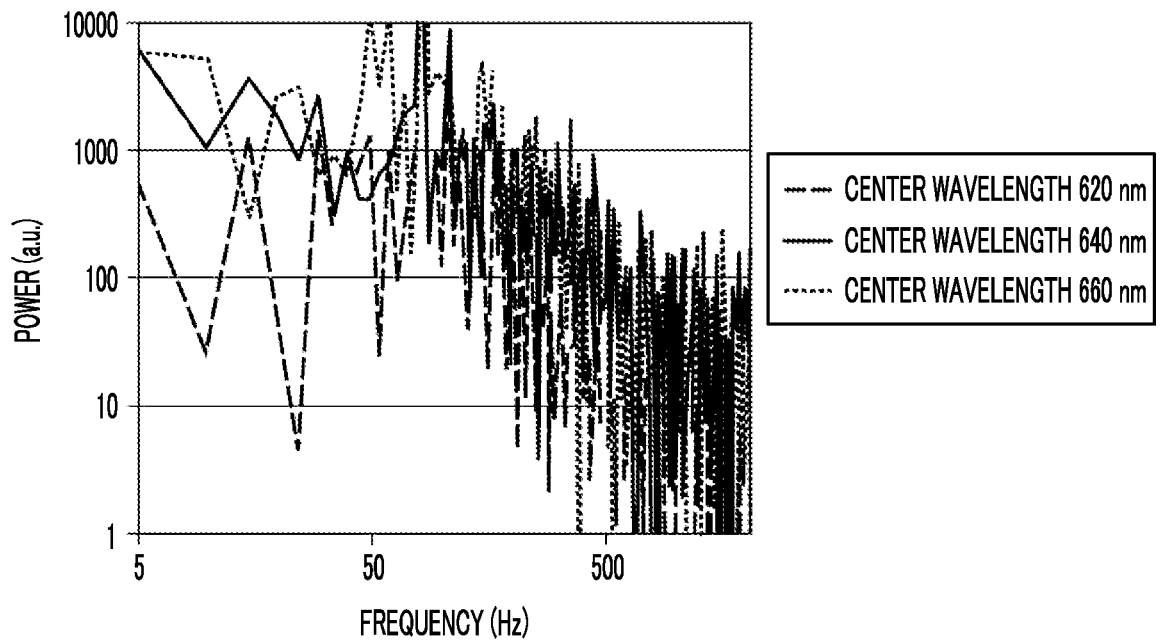
FIG. 2 is a graph showing an example of a power spectrum obtained by a first example of an optical measurement method of the embodiment of the present invention.
Figure 3:
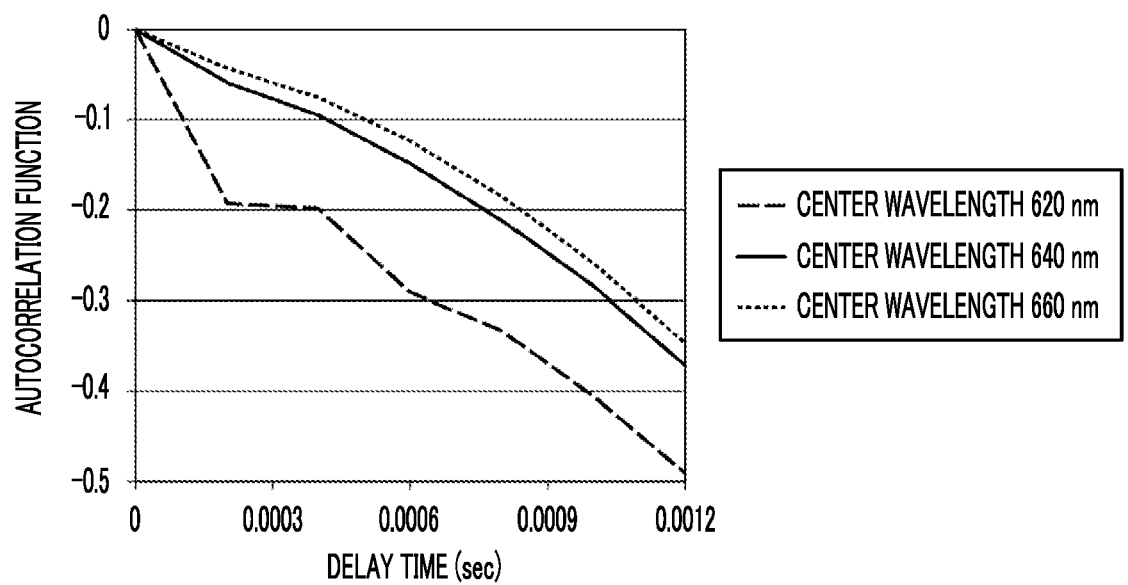
FIG. 3 is a graph showing an example of an autocorrelation function obtained by the first example of the optical measurement method of the embodiment of the present invention.

FIG. 2 is a graph showing an example of a power spectrum obtained by a first example of an optical measurement method of the embodiment of the present invention, and FIG. 3 is a graph showing an example of an autocorrelation function obtained by the first example of the optical measurement method of the embodiment of the present invention.

For example, an interference light intensity per wavelength of a dispersion liquid including polystyrene particles having a diameter of 1 μm and a concentration of 1% by mass is detected using the optical measurement device 10 shown in FIG. 1 described above. Out of spectrums of interference light obtained by the first detection unit 14a, interference intensity spectrums of three wavelengths of center wavelengths of 620 nm, 640 nm, and 660 nm are representatively extracted. With respect to the center wavelengths of 620 nm, 640 nm, and 660 nm, a width of each wavelength is ±9 nm.

Next, in the conversion unit 15, data of a signal component proportional to an electric field of scattered light of each wavelength at the specific depth is acquired from the interference light intensity detected by the first detection unit 14a. Data of the scattering intensity of each wavelength is converted into a power spectrum as the time fluctuation data of scattered light at the specific depth of the dispersion liquid Lq. With this, the power spectrum shown in FIG. 2 is obtained. In the conversion unit 15, the power spectrum shown in FIG. 2 is subjected to inverse Fourier transform, and the autocorrelation function for each wavelength is obtained as shown in FIG. 3. A numerical value on the vertical axis of FIG. 3 is a common logarithm.

Next, in the calculation unit 16, for example, in regard to the common logarithm ($\log_{10}$) of the autocorrelation function of each wavelength shown in FIG. 3, an inclination Γg is obtained. A diffusion coefficient D at each wavelength is obtained using the inclination Γg. The diffusion coefficient D is represented by D=Γg/$q^2$. q is a scattering vector.

Here, the diffusion coefficient D and the particle diameter d are represented by d=$k_B$T/(3πηD) based on a Stokes-Einstein's expression. $k_B$ is a Boltzmann's constant, T is an absolute temperature, and η is viscosity of a solvent of a dispersion liquid. A method of calculating a particle distribution from the inclination of the autocorrelation function is not limited to this method, a CONTIN method, a histogram method, cumulant expansion, or the like is known, and such methods can be used.

Next, in the calculation unit 16, a rheological particle size of the polystyrene particles at each wavelength is obtained using the diffusion coefficient D of each wavelength. The rheological particle size is the above-described particle diameter d. As a result, 0.9 μm is obtained at the center wavelength of 620 nm, 1.1 μm is obtained at the center wavelength of 640 nm, and 1.2 μm is obtained at the center wavelength of 660 nm. An average value of the obtained particle diameters is 1.06 μm. In this way, in a case where a plurality of wavelengths are used, a particle diameter can be measured with respect to the polystyrene particles having a particle diameter of 1 μm and a concentration of 1% by mass.

First Example of Optical Measurement Method

The first method of the optical measurement method uses a plurality of wavelengths in the optical measurement device 10.

Figure 4:
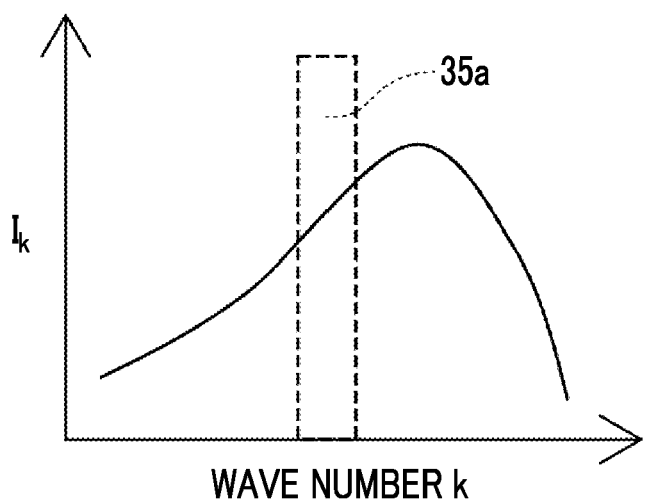
FIG. 4 is a graph showing an example of an interference spectrum obtained by the first example of the optical measurement method of the embodiment of the present invention.

For example, a dispersion liquid including particles is measured using a super-continuum light source. With the measurement, light of each wavelength is detected by the photodetector 33 of the first detection unit 14a. Light of each wavelength incident on the photodetector 33 includes interference light of scattered light and reference light, and is represented by, for example, an interference spectrum shown in FIG. 4. In FIG. 4, the vertical axis is a light intensity, and the horizontal axis is a wave number.

An intensity $I_k$ of the interference spectrum shown in FIG. 4 is represented by an expression described below. In the expression described below, $E_S$ is an electric field of scattered light, $E_S^*$ is a complex conjugated quantity of $E_S$, $E_R$ is an electric field of reference light, and $E_R^*$ is a complex conjugated quantity of $E_R$.

$$I_k=|E_R+E_S|^2=|E_R|^2+|E_S|^2+E_R E_S^*+E_S E_R^*$$

Figure 5:
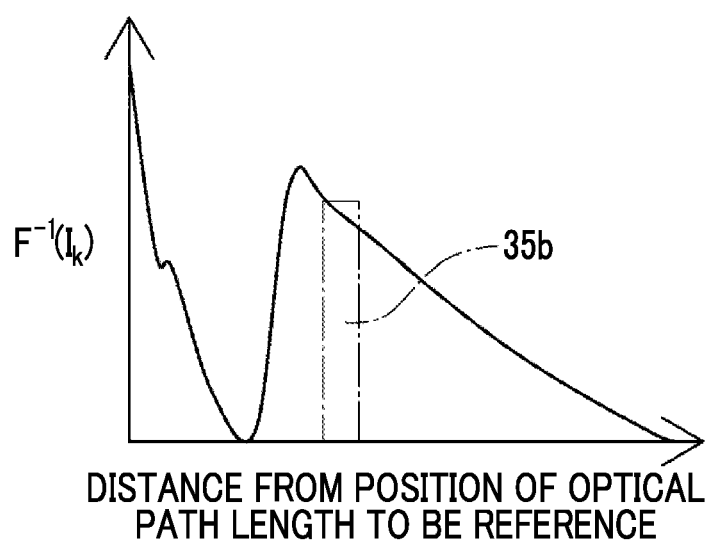
FIG. 5 is a graph showing an example of a scattering profile in a depth direction of a dispersion liquid obtained by the first example of the optical measurement method of the embodiment of the present invention.

Next, in regard to the interference spectrum shown in FIG. 4, for example, a wavelength range 35a having a center wavelength of 620 nm is extracted. A width of the wavelength range 35a is ±9 nm with respect to center wavelength 620 nm. With this, a scattering intensity of a specific wavelength range is extracted from data of a scattering intensity per wavelength. After the scattering intensity of the specific wavelength range is extracted, inverse Fourier transform $F^{-1}$ is performed on the intensity $I_k$ of the interference spectrum with respect to the wavelength range. With this, for example, a scattering profile $F^{-1}(I_K)$ in a depth direction of the dispersion liquid Lq at the center wavelength of 620 nm is obtained. An example of the scattering profile in the depth direction of the dispersion liquid Lq is shown in FIG. 5. In FIG. 5, the vertical axis is $F^{-1}(I_K)$, and the horizontal axis is a distance from a position of an optical path length to be a reference. The reference optical path length position is equal to the optical path length of reference light, and for example, in a case where an optical path length of reflected light generated on an interface between the sample cell and the dispersion liquid and the optical path length of the reference optical path length position are made to be equal to each other, the horizontal axis is a depth from the interface.

The inverse Fourier transform is represented by an expression described below.

$$F^{-1}(I_K)=|r_r|^2 E_0^2 \delta(z)+r_r E_0^2 \rho(s/2)+E_0^2 \Gamma_\rho(s/2)$$

$r_r$ is reflectance with respect to an electric field of the reflector 22, $E_0$ is an electric field of light with which a sample is irradiated, δ(z) is a delta function, ρ is diffuse reflectance of a scattering electric field from a position of a depth s/2 from the interface of the dispersion liquid, and $\Gamma_\rho$, is an autocorrelation function with respect to depth dependence of the diffuse reflectance of the scattering electric field.

In a profile in a depth direction of the dispersion liquid shown in FIG. 5, for example, a single scattering region is extracted as a depth-of-interest region 35b. The single scattering region, that is, a region where light is scattered by one degree is determined by an optical path length in the optical measurement device 10, and in the optical measurement device 10, it is preferable that an optical path length of the single scattering region is specified in advance. The above-described depth-of-interest region 35b corresponds to the specific depth of the dispersion liquid Lq.

Figure 6:
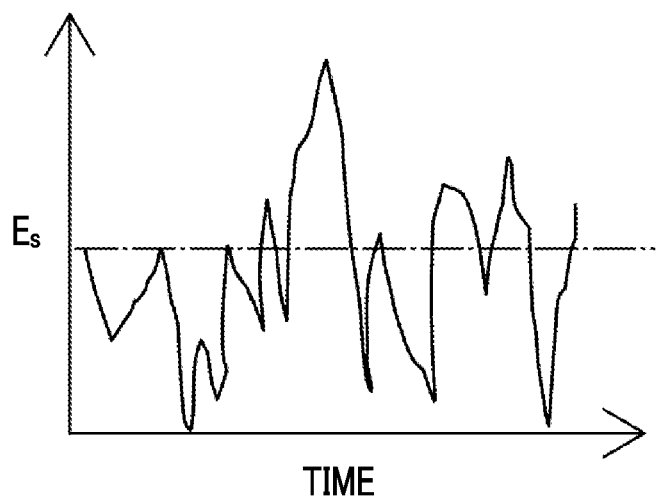
FIG. 6 is a graph showing an example of a time response of an electric field obtained by the first example of the optical measurement method of the embodiment of the present invention depth-of-interest region.

A time response of an electric field of the depth-of-interest region 35b is obtained by the first detection unit 14a. All of time-series data of signals obtained by a line detector are processed in the same manner, and time dependency of a signal amount proportional to a scattering electric field $E_0\rho(s/2)$ in the depth-of-interest region 35b is obtained. This is shown in FIG. 6. In FIG. 6, the vertical axis is an electric field, and the horizontal axis is time.

Figure 7:
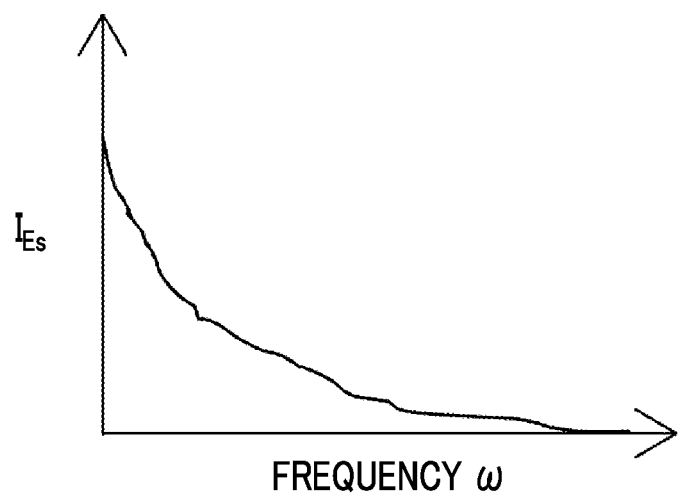
FIG. 7 is a graph showing an example of a power spectrum obtained by the first example of the optical measurement method of the embodiment of the present invention.

The time dependency of the scattering electric field shown in FIG. 6 is subjected to Fourier transform and squared. With this, a frequency response of an intensity of scattered light, that is, the power spectrum shown in FIG. 7 is obtained. In FIG. 7, the vertical axis is an intensity, and the horizontal axis is a frequency. A power spectrum $I_{ES}$ shown in FIG. 7 is represented by the following expression. In the following expression, ΓES is a time correlation function (=autocorrelation function) of an electric field.

$$I_{Es} = E_s\left(\frac{s}{2}, \omega\right)E_s\left(\frac{s}{2}, \omega\right) = \int\int E_s(t)E_s^*(t')e^{-i\omega(t-t')}dtdt' = \int \Gamma_{Es}(\tau)e^{-i\omega\tau}d\tau$$

Figure 8:
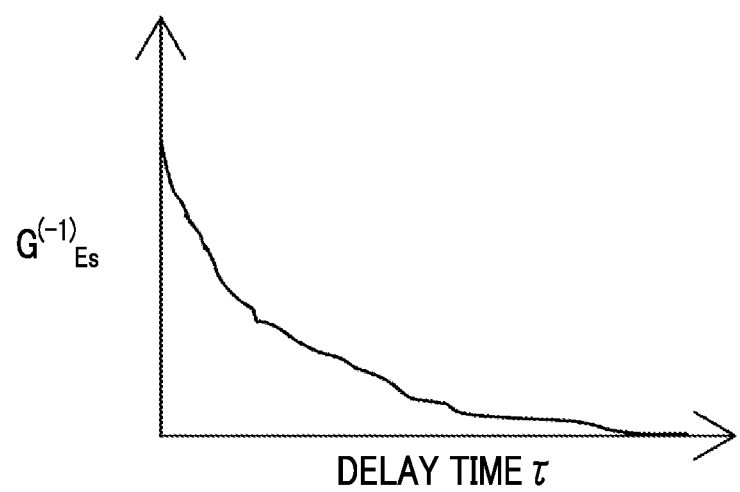
FIG. 8 is a graph showing an example of a time correlation function obtained by the first example of the optical measurement method of the embodiment of the present invention.

Next, the power spectrum $I_{ES}$ shown in FIG. 7 is subjected to inverse Fourier transform. With this, the autocorrelation function of the scattering electric field is obtained. This is shown in FIG. 8. In FIG. 8, the vertical axis is an autocorrelation function, and the horizontal axis is a delay time. The inverse Fourier transform is represented by an expression described below.

$$F^{-1}(I_{ES})=\Gamma_{ES}(\tau)=G_{ES}^{(1)}(\tau)$$

In the above-described manner, the power spectrum or the autocorrelation function is obtained as the time fluctuation data of scattered light at the specific depth of the dispersion liquid Lq from data of the extracted interference light intensity. The conversion of data of the scattering intensity per wavelength detected by the first detection unit 14a into the power spectrum or the autocorrelation function at the specific depth of the dispersion liquid Lq is performed by the conversion unit 15.

Next, in the calculation unit 16, the particle diameter of the particles is calculated using the power spectrum or the autocorrelation function that is the time fluctuation data acquired by the conversion unit 15. A calculation method of the particle diameter of the particles using the autocorrelation function is as shown in FIG. 3 described above.

Wavelength dependence of a time average of the scattering electric field can be obtained by calculating a time average of a signal of the depth-of-interest region 35b shown in FIG. 5 after taking out the wavelength range 35a shown in FIG. 4, and dividing the time average by an intensity signal of the same wavelength range as the wavelength range 35a in a spectrum of reference light. In a case where square is further made, a scattered light intensity standardized by a light source spectrum is obtained. In the above-described manner, for example, information of static light scattering subjected to single scattering in a wavelength range having a center wavelength of 620 nm.

For example, in regard to a wavelength range having a center wavelength of 640 nm, for example, a wavelength range having a center wavelength of 660 nm, information of static light scattering subjected to single scattering at each wavelength can also be obtained by extracting the wavelength range having the center wavelength of 640 nm and the wavelength range having the center wavelength of 660 nm from the interference spectrum shown in FIG. 4. A width of the wavelength range is, for example, ±9 nm with respect to the center wavelengths of 640 and 660 nm.

Figure 9:
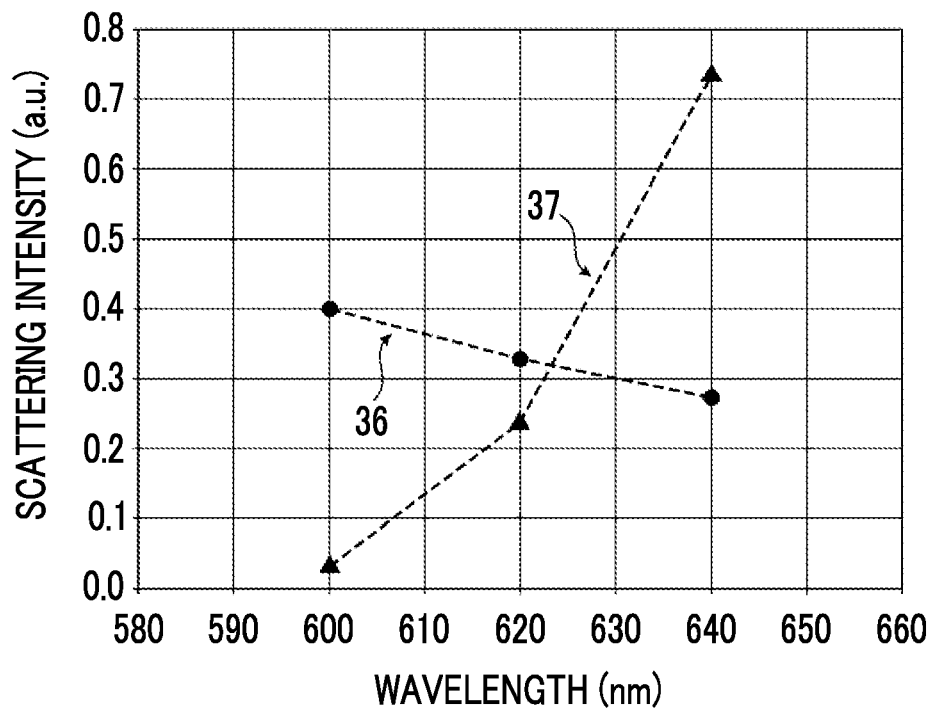
FIG. 9 is a graph showing wavelength dependency of a scattering intensity.
Figure 10:
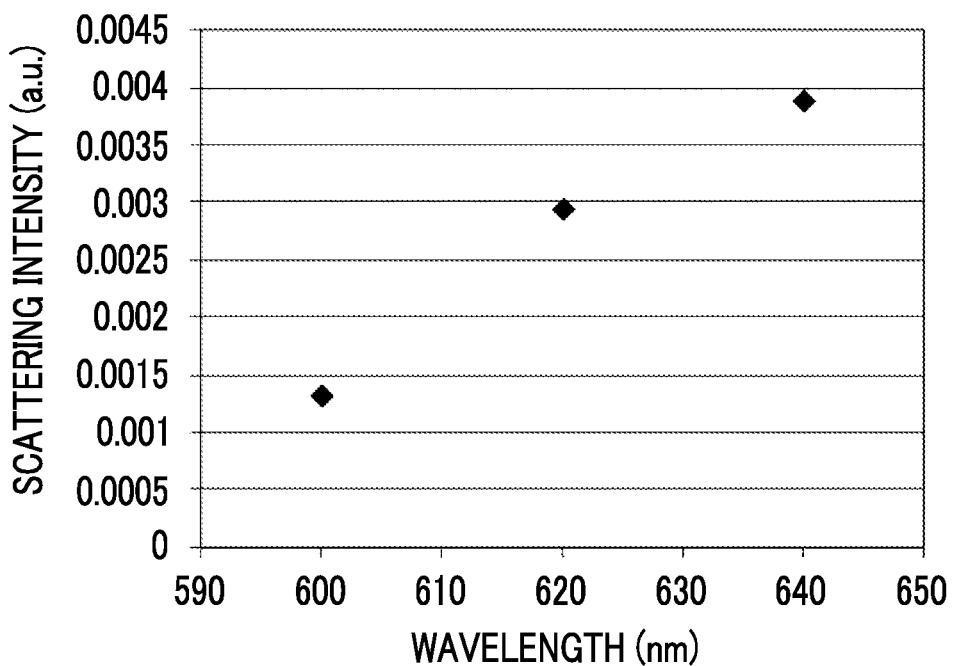
FIG. 10 is a graph showing wavelength dependency of a static light scattering intensity.

Here, FIG. 9 is a graph showing wavelength dependency of a scattering intensity, and FIG. 10 is a graph showing wavelength dependency of a static light scattering intensity. FIG. 9 is obtained by theoretical calculation, and FIG. 10 is obtained by measurement.

A profile 36 shown in FIG. 9 shows a scattering intensity of a cross-linking aggregate having a rheological diameter of 1000 nm formed of polystyrene particles having a diameter of 50 nm. The cross-linking aggregate has an average inter-particle distance equal to or greater than the particle diameter of polystyrene particles. A profile 37 shows a scattering intensity of a single particle of a polystyrene particle having a diameter of 1000 nm. In FIG. 9, the vertical axis is a scattering intensity, and the horizontal axis is a wavelength. For example, data of the single particles and the cross-linking aggregate of FIG. 9 is stored in the storage unit 17 (see FIG. 1) as a model library.

The cross-linking aggregate is formed of, for example, particles having a predetermined size and a polymer between the particles. As the polymer, a polymer having a functional group (for example, a polar group) for aggregating the particles is usually used.

As shown in FIG. 9, in the cross-linking aggregate represented by the profile 36, the scattering intensity decreases with respect to an increase in wavelength. On the other hand, in the single particle having the diameter of 1000 nm represented by the profile 37, the scattering intensity increases with respect to an increase in wavelength.

FIG. 10 shows a static light scattering intensity obtained by measuring a single particle of a polystyrene particle having a diameter of 1000 nm and a concentration of 1% by mass. Like the wavelength dependency of the static light scattering intensity shown in FIG. 10, in the single particle of the polystyrene particles, the scattering intensity increases with respect to an increase in wavelength.

In a dynamic light scattering method (DLS), as shown in an analysis case of data of time fluctuation of scattered light described above, it is only understood that the rheological size of the particles is 1000 nm. For this reason, even though it is understood that the particle diameter of the particles is 1000 nm, it is not possible to determine whether the particles are the above-described cross-linking aggregate or the single particles cannot be made. As shown in the profile 37 shown in FIG. 9, in the single particle, the scattering intensity increases with respect to an increase in wavelength. From this, determination can be made that a signal obtained by an experiment of FIG. 10 relates to the single particle of the polystyrene particle having the diameter of 1000 nm. The determination of the single particle is performed by the calculation unit 16.

In a procedure (see FIG. 20) described below, not only the rheological particle size but also the state of the particles in the dispersion liquid and the type of particle in the dispersion liquid can be determined by comparing a combination of wavelength dependence of dynamic light scattering and static light scattering with data of the model library. The state of the particles in the dispersion liquid is, for example, an aggregation state. The type of particle in the dispersion liquid and the state of the particles in the dispersion liquid are determined by the calculation unit 16. In the calculation unit 16, determination about at least one of the type of particle in the dispersion liquid or the state of the particles in the dispersion liquid may be performed.

Second Example of Optical Measurement Method

A second example of the optical measurement method uses a plurality of scattering angles. For example, a dispersion liquid including particles is measured using a supercontinuum light source.

Figure 11:
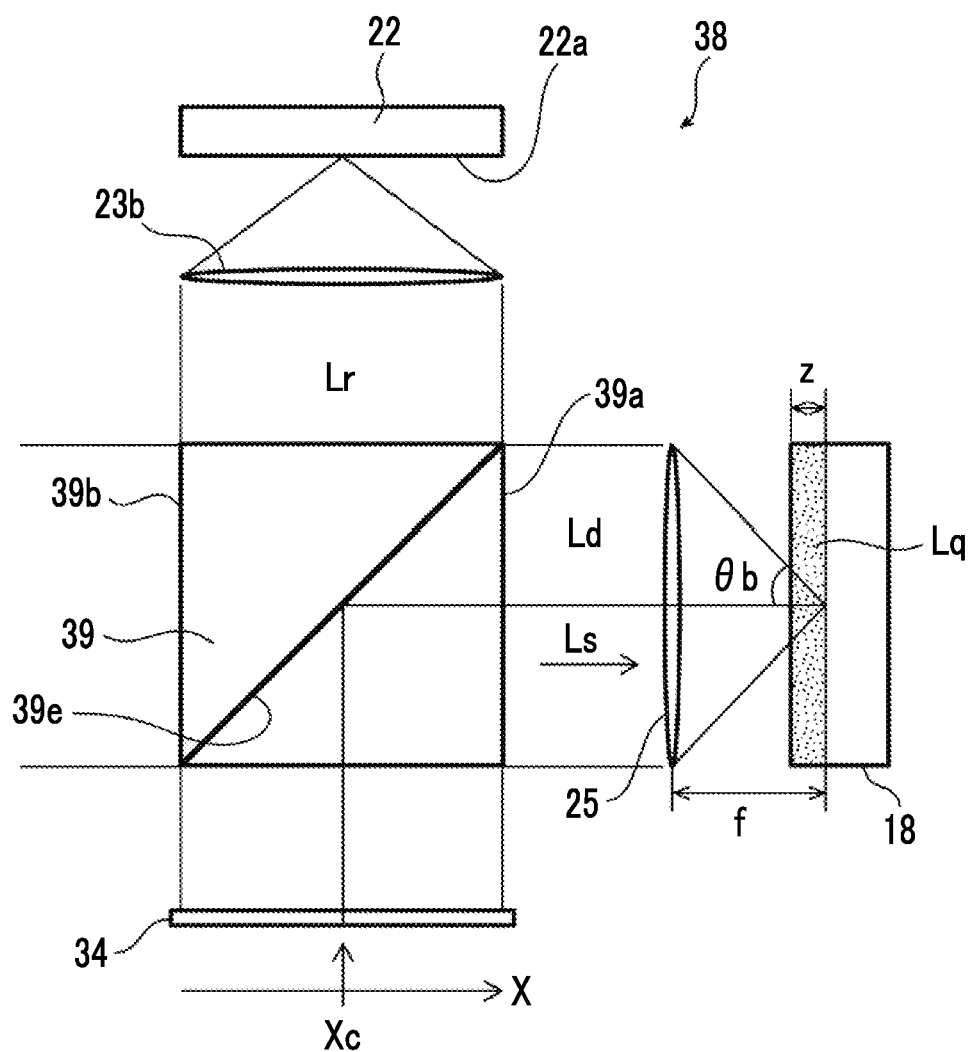
FIG. 11 is a schematic view showing an optical device for describing a second example of an optical measurement method of the embodiment of the present invention.

FIG. 11 is a schematic view showing an optical device for describing the second example of the optical measurement method of the embodiment of the present invention. An optical device 38 shown in FIG. 11 is simplified in configuration for describing measurement using a plurality of scattering angles in the optical measurement device 10 shown in FIG. 1. In FIG. 11, the same components as those in the optical measurement device 10 shown in FIG. 1 are represented by the same reference numerals, and detailed description thereof will not be repeated.

In the optical device 38 shown in FIG. 11, for example, the photodetector 34 and the reflector 22 are disposed with a regular hexahedron-shaped cube type beam splitter 39 interposed therebetween. The objective lens 23b is disposed between the beam splitter 39 and the reflector 22. A surface 39a of the beam splitter 39 is a surface in a direction perpendicular to a direction in which the reflector 22 and the photodetector 34 are arranged. The sample cell 18 in which the dispersion liquid Lq is stored is provided to face the surface 39a of the beam splitter 39. The objective lens 25 is disposed between the surface 39a of the beam splitter 39 and the dispersion liquid Lq. The beam splitter 39 has a transmitting and reflecting surface 39e that splits incident light into two kinds of light or multiplexes two kinds of incident light. While the beam splitter 39 is a regular hexahedron-shaped cube type beam splitter, the form of the beam splitter is not limited to a cube type, and a flat plate-shaped plate type.

The photodetector 34 is a line camera in which a photoelectric conversion element is disposed on a straight line as described above. In the photodetector 34, in a case where position coordinates of the line camera are referred to as x, coordinates xc are coordinates in a case where a scattering angle θb is 0° with an angle of backward scattered light or regularly reflected light of the sample cell as a reference, that is, coordinates in a case where the scattering angle θ is 180°. The position coordinates x of the line camera are represented by x=f·sin θb+xc. f is a focal length of the objective lens 25. For this reason, in FIGS. 12 and 13 described below, information of scattered light from each depth is included. A position where reference light and scattered light in the depth direction of the dispersion liquid Lq are made to interfere with each other can be changed by adjusting the position of the reflector 22. With this, an optical path length of reference light is adjusted to be an optical path length of single scattered light from the dispersion liquid, whereby a signal subjected to interference with single scattered light can be made.

The incident light Ls is incident on a surface 39b opposite to the surface 39a of the beam splitter 39. The incident light Ls is transmitted through the transmitting and reflecting surface 39e, the dispersion liquid Lq is irradiated with the incident light Ls by way of the objective lens 25, and the scattered light Ld at the scattering angle θ is generated. The scattered light Ld is incident on the transmitting and reflecting surface 39e of the beam splitter 39, and is reflected by the transmitting and reflecting surface 39e, so that the scattered light Ld is incident on the photodetector 34.

Figure 12:
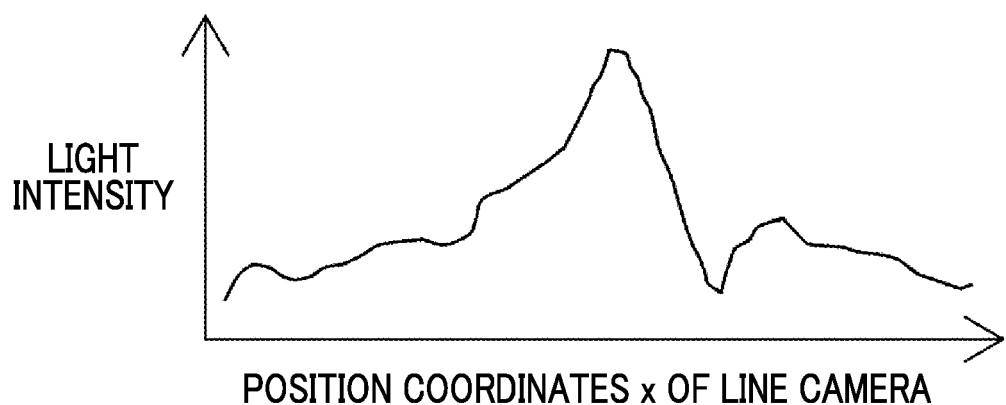
FIG. 12 is a graph showing an example of a light intensity obtained by the second example of the optical measurement method of the embodiment of the present invention.

On the other hand, the incident light Ls is split by the transmitting and reflecting surface 39e of the beam splitter 39 and is incident on the reflector 22. The reference light Lr reflected by the reflecting surface 22a of the reflector 22 is transmitted through the transmitting and reflecting surface 39e and is incident on the photodetector 34. In this way, the scattered light Ld and the reference light Lr are incident on the photodetector 34, and interference occurs. With this, an intensity of interference light shown in FIG. 12 is obtained. In FIG. 12, the vertical axis is a light intensity, and the horizontal axis is position coordinates of a line camera. The intensity of interference light shown in FIG. 12 is represented by the following expression.

$$I_{INTERFERNCE}(x,t) = I_R + I_S + 2\,Re\{E_R E_S^*(x, z_{INTERFERENCE})\}(t)$$

Here, in the expression of $I_{INTERFERNCE}(x,t)$, x is the position coordinates of the line camera, t is time, $I_R$ is an intensity of reference light, $I_s$ is an intensity of scattered light, $Re\{E_R E_S^*\}$ is a function for taking a real part, $E_R$ is an electric field of reference light, $E_s$ is an electric field of scattered light, z is an interference position in an optical axis direction in the dispersion liquid, that is, an interference position in the depth direction of the dispersion liquid.

A light intensity in noninterference is represented by $I_{NONINTERFERENCE}(x,t) = I_R + I_S$. A spectrum of noninterference is obtained, for example, by disposing a thick glass plate at the position of the dispersion compensation adjustment unit 23a shown in FIG. 1 to extend the optical path length of reference light and changing the optical path length. $I_{NONINTERFERENCE}(x,t)$ may be obtained by taking a time average $<I_{INTERFERENCE}(x,t)>_t$ of $I_{INTERFERENCE}(x,t)$ as simpler approximation.

Figure 13:
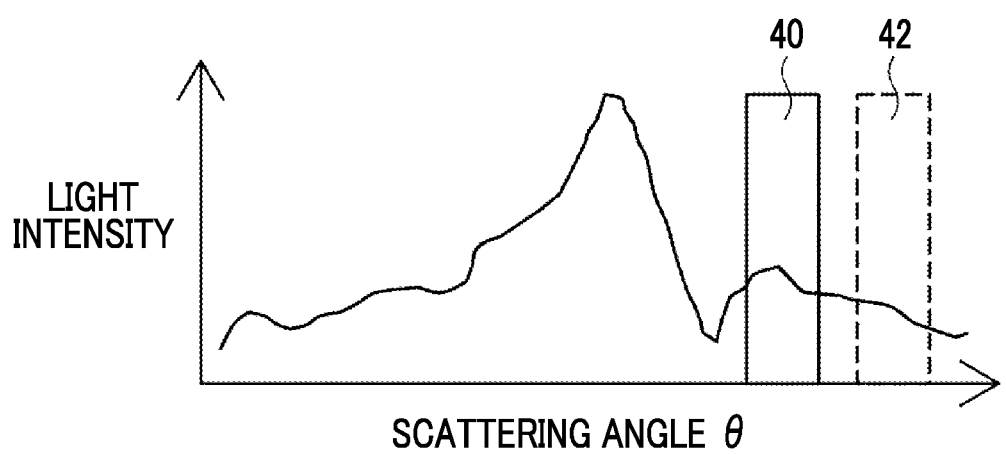
FIG. 13 is a graph showing an example of a profile of a scattering intensity with respect to a scattering angle obtained by the second example of the optical measurement method of the embodiment of the present invention.

The light intensity shown in FIG. 12 is converted into a light intensity with respect to the scattering angle θ as shown in FIG. 13 using x=f·sin θb+xc described above. FIG. 13 shows a profile of a scattering intensity with respect to a scattering angle. In FIG. 13, the vertical axis is a light intensity and indicates a scattering intensity, and the horizontal axis is a scattering angle.

The light intensity of FIG. 13 is represented by $I_{INTERFERENCE}(θ,t) = I_R + I_S + 2Re\{E_R E_S^*\}$. A light intensity in noninterference is represented by $I_{NONINTERFERENCE}(θ, t) = I_R + I_S$.

Next, in FIG. 13, for example, an angle-of-interest region 40 and an angle-of-interest region 42 are set. With this, a plurality of interference light intensities $I_{INTERFERENCE}(θ,t)$ including information of an electric field of scattered light at a specific scattering angle are extracted.

Figure 14:
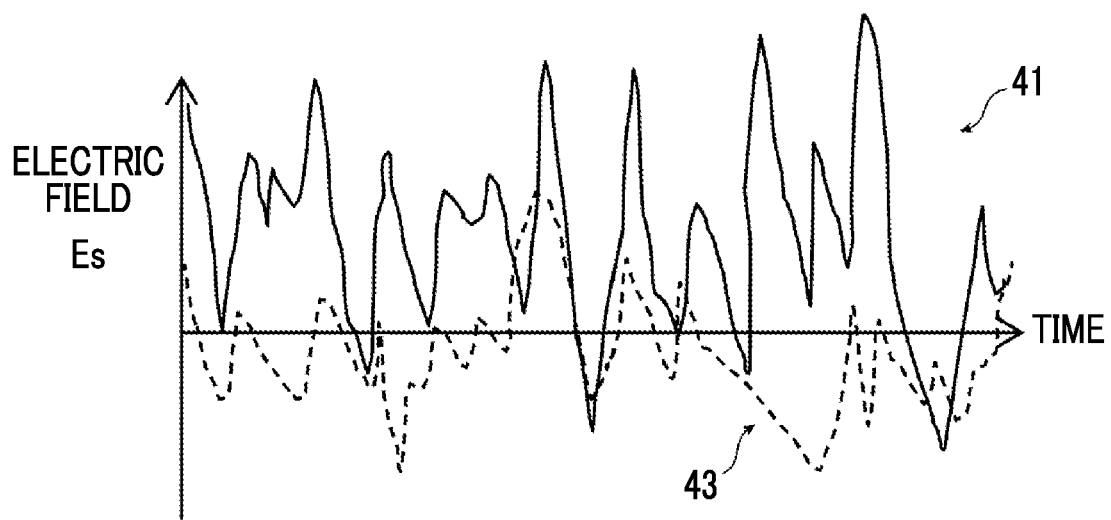
FIG. 14 is a graph showing an example of a time response of an electric field of an angle-of-interest region obtained by the second example of the optical measurement method of the embodiment of the present invention.

A time response of an electric field of the angle-of-interest regions 40 and 42 is obtained by the second detection unit 14b. With this, in regard to the angle-of-interest region 40, a profile 41 showing time dependency of a scattering electric field shown in FIG. 14 is obtained. Also in regard to the angle-of-interest region 42, a profile 43 showing time dependency of a scattering electric field shown in FIG. 14 is obtained.

FIG. 14 is a graph in a case where a component of a scattering angle in a region of interest is extracted and graphed as change in time series, and shows fluctuation of a time region of a component of a scattering angle θ. In FIG. 14, the vertical axis is an electric field, and the horizontal axis is time.

Figure 15:
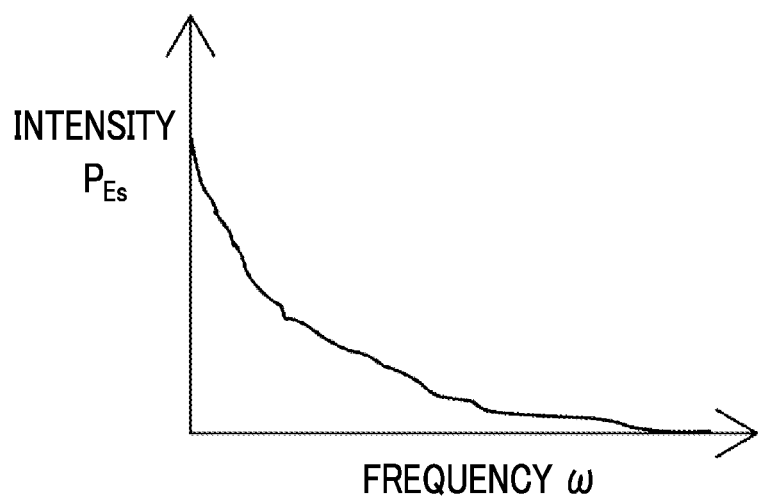
FIG. 15 is a graph showing an example of a power spectrum obtained by the second example of the optical measurement method of the embodiment of the present invention.

Next, the profiles 41 and 43 showing the time dependency of the electric field shown in FIG. 14 are subjected to Fourier transform and are squared. With this, a frequency response of an intensity of scattered light, that is, a power spectrum shown in FIG. 15 is obtained. In FIG. 15, while the power spectrum shows only one angle-of-interest region 40, also in regard to the angle-of-interest region 42, a power spectrum can be obtained in the same manner as the angle-of-interest region 40.

In FIG. 15, the vertical axis is an intensity, and the horizontal axis is a frequency. A value on the vertical axis of FIG. 15 is obtained by subtracting $P_{NONINTERFERENCE}(θ,t)$ described below from $P_{INTERFERENCE}(θ,t)$ described below. In the following expressions, F* indicates a complex conjugate.

$$P_{INTERFERENCE}(θ,t) = F\{I_{INTERFERENCE}\}F^*\{I_{INTERFERENCE}\}$$

$$P_{NONINTERFERENCE}(θ,t) = F\{I_{NONINTERFERENCE}\}F^*\{I_{NONINTERFERENCE}\}$$

Figure 16:
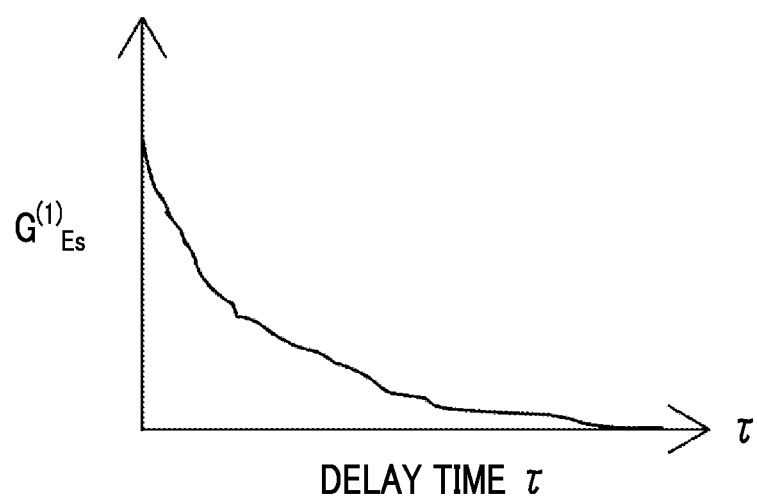
FIG. 16 is a graph showing an example of an autocorrelation function obtained by the second example of the optical measurement method of the embodiment of the present invention.

Next, the power spectrum shown in FIG. 15 is subjected to inverse Fourier transform. With this, as shown in FIG. 16, an autocorrelation function of a scattering electric field Es at a scattering angle θ is obtained. In FIG. 16, the vertical axis is an autocorrelation function, and the horizontal axis is a delay time.

The power spectrum shown in FIG. 15 or the autocorrelation function shown in FIG. 16 is the above-described time fluctuation data. The fitting is performed based on the principle of the dynamic light scattering method using the power spectrum shown in FIG. 15 or the autocorrelation function shown in FIG. 16, whereby the rheological size of the particles can be obtained.

Here, a spatial intensity distribution $I_R(x)$ of the reference light is represented by $I_R(x) = |E_R|^2$.

$$Re\{E_R E_S^*\}(θ) = (I_{INTERFERENCE} - I_{NONINTERFERENCE})/2.$$

Re{$E_R E_S^*$}($\theta$) is standardized using $I_R(\theta)$ obtained by converting the spatial intensity distribution $I_R(x)$ of reference light into a function of $\theta$ corresponding to coordinates of a line detector for convenience, and a time average is taken, whereby scattering angle dependence Is($\theta$) of a static light scattering electric field is obtained.

$$Is(\theta) = <|Re\{E_R E_S^*\}(\theta)^2>_{timeaverage}/2I_R$$

A result of measurement regarding the dispersion liquid including the polystyrene particles having a particle diameter of 1000 nm and a concentration of 1% by mass using incident light having a center wavelength of 650 nm in the above-described optical measurement device 10 will be described. A solvent of the dispersion liquid is water. A measurement depth is set to a position of 50 μm from a surface of the dispersion liquid, that is, a gas-liquid interface. A depth of the dispersion liquid is set to 50 μm. In regard to the Incident light, for example, the center wavelength is set to 650 nm and the wavelength width is set to 33 nm with respect to the center wavelength using a band-pass filter.

The particle diameter of the particles is measured using components of scattered light at a scattering angle of 175°, a scattering angle of 173°, and a scattering angle of 172.5° among a plurality of obtained scattering angles. The above-described scattering intensity indicates a central angle, and a full width of the scattering angle is 0.5°. The full width of the scattering angle is 0.5° means an angle center value ±0.25°. For example, the scattering angle is 175° means that the scattering angle is 175°±0.25°.

In the optical measurement device 10, in regard to scattered light generated by irradiating the dispersion liquid Lq with the incident light having the center wavelength of 650 nm described above, light at each scattering angle is detected by the photodetector 34 in the second detection unit 14b, and data of an interference light intensity is obtained.

Figure 17:
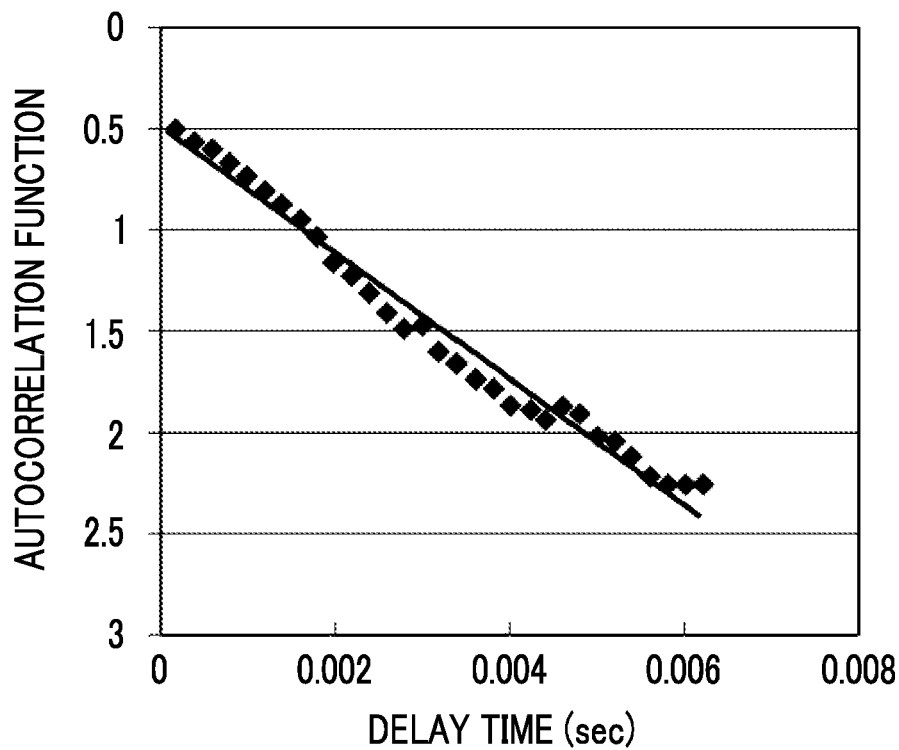
FIG. 17 is a graph showing a result of a particle diameter obtained with fitting to the autocorrelation function at a scattering angle of 175°.
Figure 18:
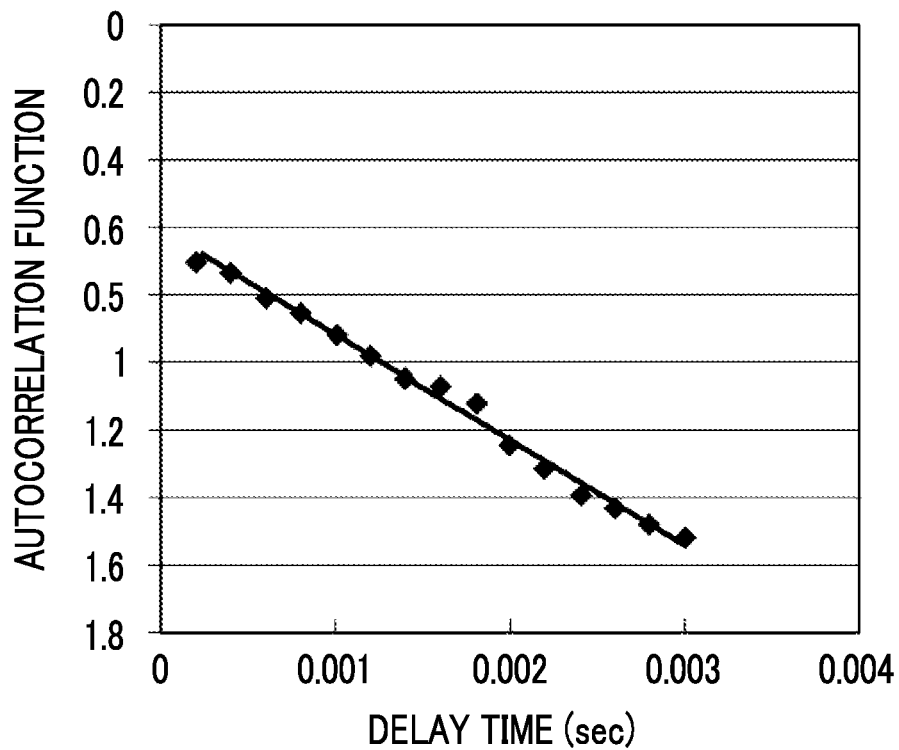
FIG. 18 is a graph showing a result of a particle diameter obtained with fitting to the autocorrelation function at the scattering angle of 173°.
Figure 19:
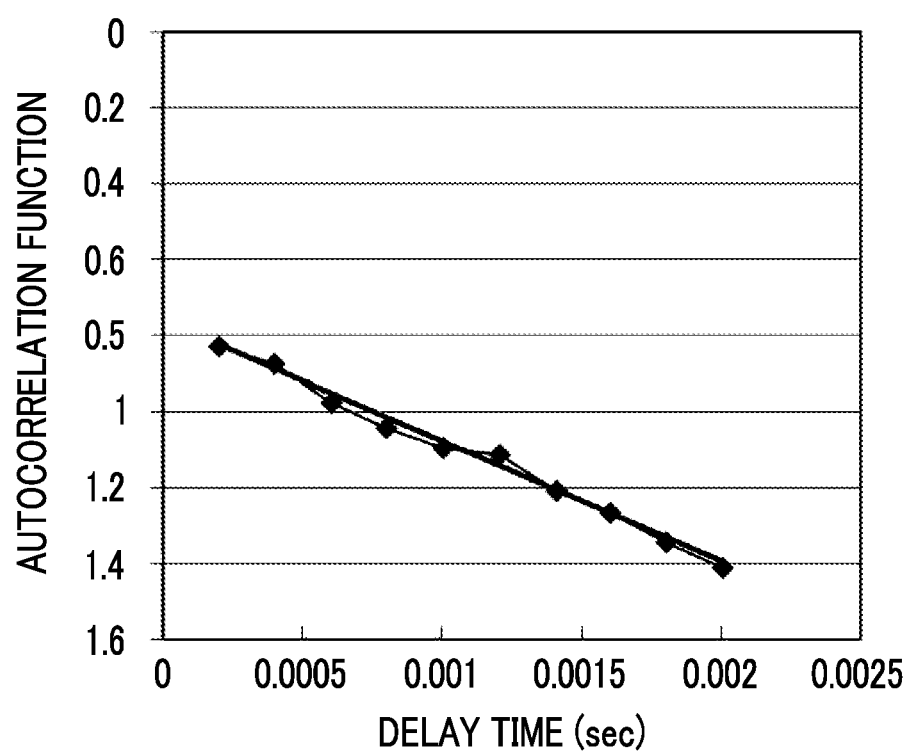
FIG. 19 is a graph showing a result of a particle diameter obtained with fitting to the autocorrelation function at the scattering angle of 172.5°.

In the conversion unit 15, data of the scattering intensity at a specific scattering angle, 175°, 173°, and 172.5° described above is obtained from data of the scattering intensity. Next, data of the extracted scattering intensity is converted into an autocorrelation function as time fluctuation data of scattered light at the depth of 50 μm of the dispersion liquid as described above. As a result, autocorrelation functions shown in plots of FIGS. 17 to 19 are obtained. FIG. 17 shows the autocorrelation function for the scattering angle of 175°, FIG. 18 shows the autocorrelation function for the scattering angle of 173°, and FIG. 19 shows the autocorrelation function for the scattering angle of 172.5°.

In the calculation unit 16, as a result of calculating the particle diameter through the fitting, results shown in FIGS. 17 to 19 are obtained. In the calculation of the particle diameter, the inclination Γg of the autocorrelation function as shown in FIG. 3 described above, and diffusion coefficient D at the scattering angle is obtained using the inclination Γg. The particle diameter d is calculated from the diffusion coefficient D by the Stokes-Einstein's expression representing a relationship between the diffusion coefficient D and the particle diameter d.

In a case of the scattering angle of 175° shown in FIG. 17, a center particle diameter is 1.03 μm. In a case of the scattering angle of 173° shown in FIG. 18, the center particle diameter is 1.04 μm. In a case of the scattering angle of 172.5° shown in FIG. 19, the center particle diameter is 1.01 μm. An average value of the obtained particle diameters is 1.027 μm. In this way, even though a plurality of scattering angles are used, it is possible to measure the particle diameter with sufficient accuracy with respect to polystyrene particles having a particle diameter of 1 μm.

Next, in the calculation unit 16, fitting the time fluctuation data acquired by the conversion unit 15 and the time averaged data obtained by time averaging the time fluctuation data acquired by the conversion unit 15 with respect to the theoretical formula that defines the relationship between the particle diameter and the scattering intensity will be described. Through the above-described fitting, the particle size distribution of each type of particle included in the dispersion liquid is obtained. While one type of particle is included in the dispersion liquid, the above example can also be applied in the same manner to determination about a quantity or a type of particle in a case where two or more types of particles are included in the dispersion liquid, by the following calculation expression. A method therefore will be described below. For the fitting, scattering characteristics of known particles may be used in addition to the theoretical formula that defines the relationship between the particle diameter and the scattering intensity.

Figure 20:
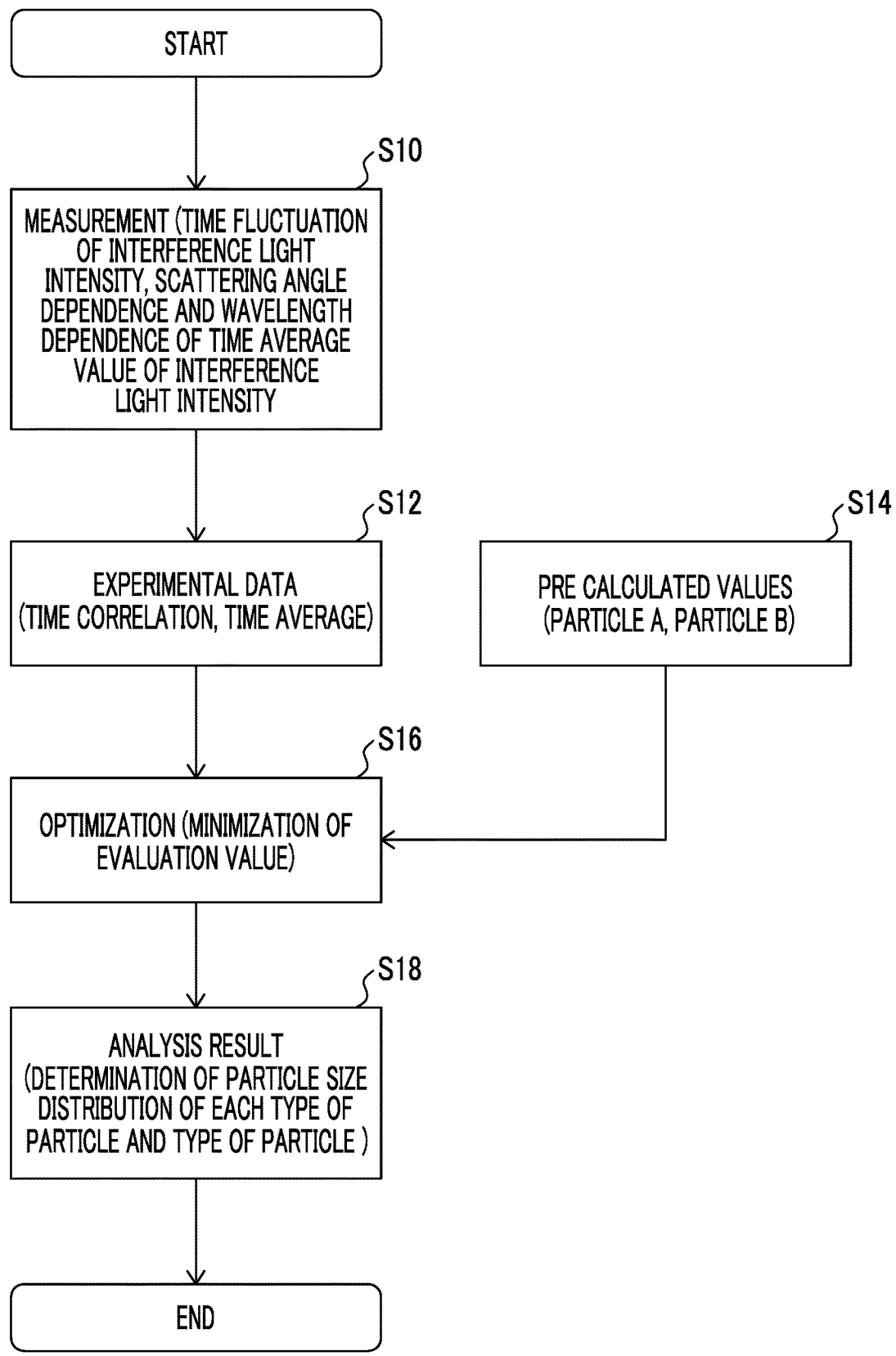
FIG. 20 is a flowchart illustrating the optical measurement method of the embodiment of the present invention.

Here, FIG. 20 is a flowchart illustrating the optical measurement method of the embodiment of the present invention.

As shown in FIG. 20, the optical measurement method has, for example, a measurement step (Step S10), a step of obtaining experimental data (Step S12), a step of obtaining pre-calculated values (Step S14), and an optimization step (Step S16). Through the optimization step (Step S16), an analysis result, that is, the particle size distribution of each type of particle of a plurality of types of particles is obtained (Step S18).

In the measurement step (Step S10), for example, the time fluctuation of the interference light intensity and scattering angle dependence or wavelength dependence of a time average value of the interference light intensity are measured.

In the step of obtaining experimental data (Step S12), for example, a time correlation with respect to the time fluctuation of the interference light intensity is obtained based on measured values of the measurement step (Step S10). The scattering angle dependence of the time average value of the interference light intensity or the wavelength dependence of the time average value of the interference light intensity is obtained.

In the step of obtaining pre-calculated values (Step S14), the scattering characteristics of the particles are obtained, for example, using data of the single particle and the cross-linking aggregate of FIG. 9 described above, stored in the storage unit 17 as the model library.

The scattering characteristics of the known particles may be measured values using the standard particles as described above. Calculated values obtained by a theoretical formula or a simulation may be used as the scattering characteristics of the particles. The scattering characteristics of the particles are, for example, the scattering angle-dependent data regarding the scattered light intensity or the wavelength-dependent data regarding the scattered light intensity of the known particles as described above.

The scattering characteristics of the particles obtained in Step S14 are used in specifying the particles in the dispersion liquid or the type of particle in the dispersion liquid. For example, the type of particle in the dispersion liquid and the state of the particles in the dispersion liquid are determined by comparing the measured values obtained in Step S10, for example, the particle size distribution value obtained from measured fluctuation data and measured wavelength-dependent data of scattered light or intensity-dependent data of scattered light with the scattering characteristics of the particles of Step S14. The measured wavelength-dependent data of scattered light and intensity-dependent data of scattered light are obtained from the time fluctuation data of scattered light acquired by the conversion unit 15.

In the optimization step (Step S16), for example, a linear autocorrelation function and a theoretical formula of the scattering intensity are fitted to the time correlation of the time fluctuation of the interference light intensity and the time average value of the interference light intensity obtained in Step S12. In Step S16, in regard to particle numbers with respect to all particle diameters, an initial value is set, and then, is updated such that an evaluation value is minimized, and a final particle number is obtained.

Hereinafter, the fitting will be more specifically described in detail.

First Example of Fitting

A case where two types of particles of a particle A and a particle B are in the dispersion liquid will be described.

It is premised that the types of the particle A and the particle B and wavelength dependency of a complex refractive index of particles in each particle diameter are known. In this case, wavelength-dependent data of a scattered light intensity that is obtained by a complex refractive index, a particle diameter, and a shape of known particles is present and is stored in the storage unit 17 (see FIG. 1) as a model library.

A linear autocorrelation function $g^{(1)}(\tau)$ is represented by $g^{(1)}(\tau)=\exp(-Dq^2\tau)$.

In a case where the two types of particles of the particles A and the particles B are in the dispersion liquid, the linear autocorrelation function is represented by Expression (1) described below. The scattering intensity is represented by Expression (2) described below. Expressions (1) and (2) described below are theoretical formulas, and $I_{total}$ in Expressions (1) and (2) is calculated values. $I_d^A$ and $I_d^B$ are theoretical values, and the pre-calculated values obtained in Step S14 described above can be used.

In Expressions (1) and (2) described below, $g^{(1)}$ indicates the linear autocorrelation function. $I_{total}$ indicates a total scattering intensity. d indicates a particle diameter. A subscript 0 to M of d indicates an ordinal number of bins of a histogram shown in FIGS. 21 and 22. N indicates a particle number. A subscript 0 to M of N indicates an ordinal number of bins of a histogram shown in FIGS. 21 and 22. The bins of the histogram are data sections, and are represented by bars in the histogram.

D indicates a diffusion coefficient. A subscript d of the diffusion coefficient D represents dependence on the particle diameter d. q indicates a scattering vector. τ indicates a time lag of the linear autocorrelation function. θ indicates a scattering angle. I indicates a scattering intensity. A subscript d of the scattering intensity I represents dependence on the particle diameter d.

In Expressions (1) and (2) described below, superscripts A and B represent that scattering intensity wavelength dependency corresponds to the particle A and the particle B.

$$g^{(1)}(\tau) = \sum_{d=d_0}^{d_M} \frac{N_d^A I_d^A}{I_{total}}\exp(-D_d q^2 \tau) + \sum_{d=d_0}^{d_M} \frac{N_d^B I_d^B}{I_{total}}\exp(-D_d q^2 \tau) \quad (1)$$

Figure 21:
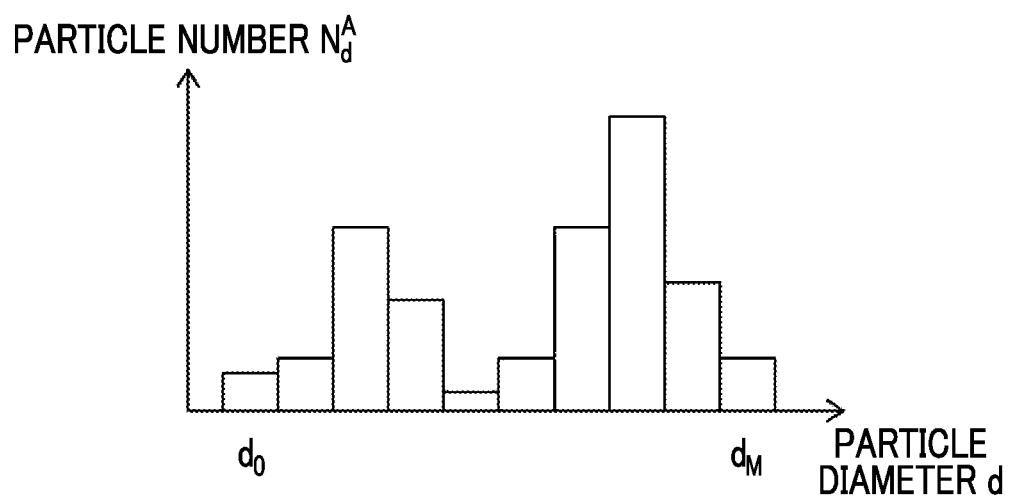
FIG. 21 is a histogram of a particle A.

In Expression (1) described above, the following term corresponds to the particle A, and corresponds to the histogram of the particle A shown in FIG. 21. In the following term, $\exp(-Dq^2\tau)$ is the linear autocorrelation function, and the other portion $N_d^A I_d^A/I_{total}$ indicates a ratio of the scattering intensity of all particles A belonging to the bins of the particle diameter d to the total scattering intensity. That is, the following term is a weight of the particles A. $I_{total}$ in Expression (1) is a theoretical value that is determined by the particle diameter. As the theoretical value, a Mie scattering theoretical formula can be used.

$$\frac{N_d^A I_d^A}{I_{total}}\exp(-D_d q^2 \tau)$$

Figure 22:
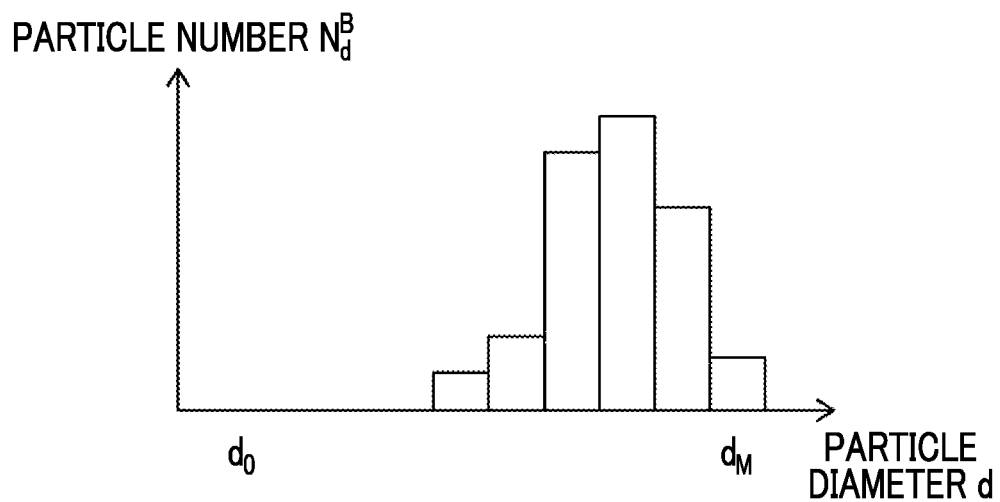
FIG. 22 is a histogram of a particle B.

In Expression (1) described above, the following term corresponds to the particle B, and corresponds to the histogram of the particle B shown in FIG. 22. In the following term, $\exp(-Dq^2\tau)$ is the linear autocorrelation function, and the other portion $N_d^B I_d^B/I_{total}$ indicates a ratio of the scattering intensity of all particles B belonging to the bins of the particle diameter d to the total scattering intensity. That is, the following term is a weight of the particle B.

$$\frac{N_d^B I_d^B}{I_{total}}\exp(-D_d q^2 \tau)$$

$$I_{total} = \sum_{d=d_0}^{d_M} N_d^A I_d^A + \sum_{d=d_0}^{d_M} N_d^B I_d^B \quad (2)$$

In Expression (2) described above, $N_d^A I_d^A$ corresponds to the scattering intensity of the particle A, and $N_d^B I_d^B$ corresponds to the scattering intensity of the particle B.

Hereinafter, the fitting for obtaining the particle size distribution of each type of particle of a plurality of types of particles will be described. In the fitting, the particle number per particle diameter is finally obtained with the particle number as a variable.

The linear autocorrelation function $g^{(1)}(\tau)$ is measured for each wavelength, and there are a plurality of linear autocorrelation functions. For example, the autocorrelation functions of a plurality of wavelengths shown in FIG. 3 are measured.

In the fitting, in regard to the linear autocorrelation function per wavelength, an initial particle number is set with the particle number as a variable in Expression (1). A calculated value of the linear autocorrelation function of Expression (1) based on the set initial particle number is obtained. The linear autocorrelation function per wavelength corresponds to time fluctuation data derived from the scattering characteristics using the theoretical formula.

A difference between the measured value of the linear autocorrelation function and the calculated value of the linear autocorrelation function of Expression (1) is obtained for each wavelength. The difference between the measured value of the linear autocorrelation function and the calculated value of the linear autocorrelation function of Expression (1) is referred to as a difference in linear autocorrelation function. The difference in linear autocorrelation function is obtained for each wavelength.

For example, as shown in FIGS. 9 and 10, the total scattering intensity $I_{total}$ is measured for each wavelength. From the description of FIGS. 9 and 10 described above, determination can also be made that the particles are the single particle, not the aggregate.

In Expression (2), the particle number is set with the particle number as a variable. A value of the total scattering intensity $I_{total}$ of Expression (2) based on the set initial particle number is obtained.

As shown in FIGS. 9 and 10, a difference between a measured value of the total scattering intensity $I_{total}$ and a calculated value of the total scattering intensity $I_{total}$ of Expression (2) is obtained for each wavelength. The difference between the measured value of the total scattering intensity $I_{total}$ and the calculated value of the total scattering intensity $I_{total}$ of Expression (2) at any wavelength is referred to as a difference in total scattering intensity $I_{total}$ at the wavelength. In regard to the total scattering intensity $I_{total}$, the difference in total scattering intensity $I_{total}$ at the wavelength is obtained. The calculated value of the total scattering intensity $I_{total}$ of Expression (2) corresponds to the time averaged data obtained by time averaging the derived time fluctuation data.

In the fitting, to obtain the final particle number, the difference in linear autocorrelation function obtained for each wavelength described above and the difference in total scattering intensity at the wavelength are used. For example, an evaluation value obtained by adding a value of the square of the difference in the linear autocorrelation function obtained for each wavelength and a value of the square of the difference in total scattering intensity at the wavelength for all wavelengths is used. The particle number with which the evaluation value is minimized is set as the final particle number.

For this reason, in the fitting, the particle number is repeatedly updated in Expressions (1) and (2) such that the evaluation value is minimized, to obtain the final particle number. This corresponds to Step S16 described above.

In regard to the particle numbers with respect to all particle diameters, an initial value is set, and then, is updated such that the evaluation value is minimized. The processing of obtaining the final particle number is executed for each particle diameter of the particles, and for example, the histogram of the particles A shown in FIG. 21 and the histogram of the particles B shown in FIG. 22 can be obtained. That is, $N_d^A$ and $N_d^B$ are obtained for all $d=d_0$ to $d_M$, whereby the particle size distribution can be obtained. This corresponds to Step S18 described above. The particle size distribution is a distribution of the number of particles with respect to the particle diameter, and for example, is in units of %.

The above step is a step of obtaining the particle size distribution of each type of particle of a plurality of types of particles. The evaluation value that is used for the fitting is not limited to the value described above.

The type of the particles in the dispersion liquid can be determined using a difference in scattering intensity with respect to the wavelength shown in FIGS. 9 and 10. For this reason, a relationship between the type of the particles and the scattering intensity with respect to the wavelength is specified in advance, whereby the type of the particles and the particle size distribution of the particles can be obtained. It is preferable that the relationship between the type of the particles and the interference light intensity with respect to the wavelength is stored in the storage unit 17. The calculation unit 16 may read out the relationship between the type of the particles and the interference light intensity with respect to the wavelength from the storage unit 17, and may obtain the type of the particles and the particle size distribution of the particles.

As described above, Expressions (1) and (2) as the two theoretical formulas are fitted to the measured linear autocorrelation function and the measured total scattering intensity $I_{total}$ to obtain the final particle number. Note that an optimization method of the fitting is not limited to the method described above, and for example, Bayesian optimization can be used for the fitting.

While the linear autocorrelation function is used in obtaining the particle number as described above, the present invention is not limited thereto, and a power spectrum may be used in place of the linear autocorrelation function.

The autocorrelation function or the power spectrum of the scattering intensity and the scattering intensity per wavelength are fitted to the theoretical formulas, whereby the particle number and the particle size distribution can be obtained for each type of particle, such as the particle A and the particle B. In a case where an impurity component is included in the dispersion liquid, since the impurity component and the particle size distribution of each type of particle can be obtained, an influence of the impurity component can be separated. For the fitting, in addition to the theoretical formulas, the time fluctuation data derived from the scattering characteristics of the known particles and the time averaged data obtained by time averaging the derived time fluctuation data may be used.

Although an example where the number of wavelengths is two has been described, the number of wavelengths is not limited to two, and the number of wavelengths may be three or four as long as the number of wavelengths is plural.

Second Example of Fitting

A case where two types of particles of single particles and an aggregate are in the dispersion liquid will be described.

It is premised that the types of the single particles and the aggregate and scattering intensity dependency of a complex refractive index of particles in each particle diameter are known. In this case, scattering angle-dependent data of a scattered light intensity that is obtained by a complex refractive index, a particle diameter, and a shape of known particles is present, and is stored in the storage unit 17 as a model library. In regard to the single particles and the aggregate, scattering angle dependence of an interference light intensity is calculated in advance. This calculation corresponds to Step S14 described above.

Figure 23:
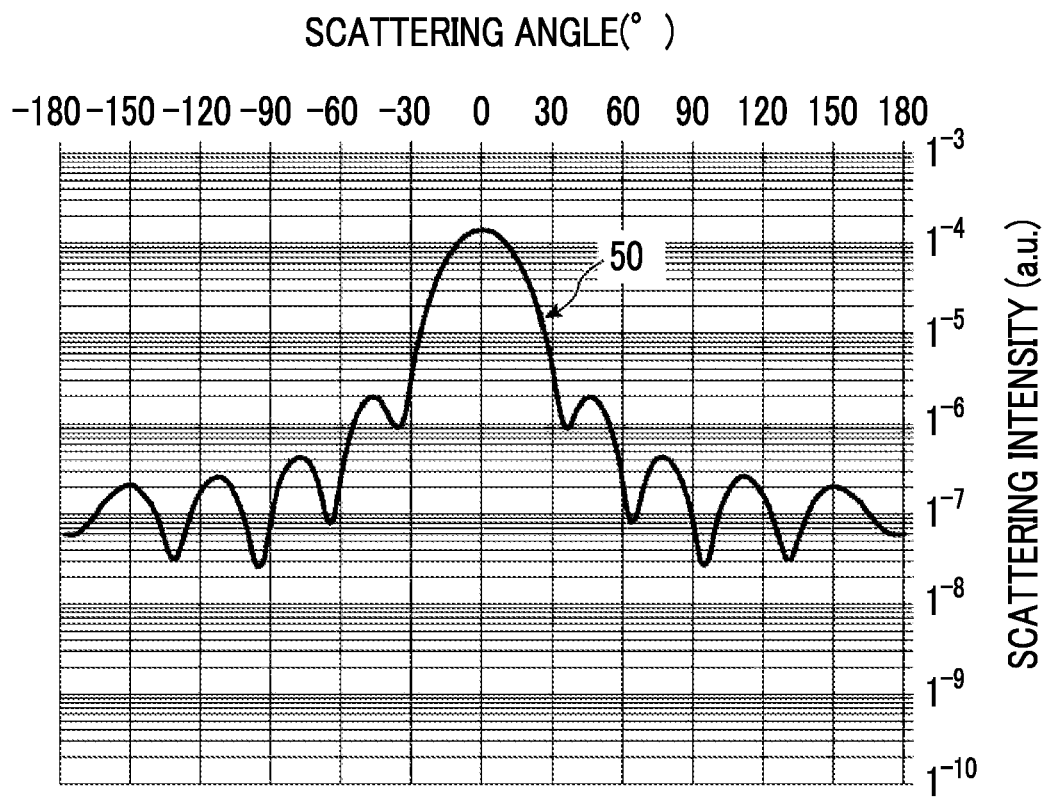
FIG. 23 is a graph showing a relationship between an interference light intensity and a scattering angle.

For example, in regard to the dispersion liquid, a measured value (see Step S10) of scattering angle dependence of the time average value of the interference light intensity is obtained on a relationship between a scattering intensity and a scattering angle as shown in FIG. 23. The processing of obtaining the relationship between the scattering intensity and the scattering angle corresponds to Step S12 described above. Data indicating the relationship between the scattering intensity and the scattering angle corresponds to scattering angle-dependent data obtained from the time fluctuation data acquired by the conversion unit. Data indicating a relationship between a scattering intensity and a wavelength may be obtained, and data indicating the relationship between the scattering intensity and the wavelength corresponds to the wavelength-dependent data obtained from the time fluctuation data acquired by the conversion unit.

In a case where two types of particles are in the dispersion liquid, the linear autocorrelation function is represented by Expression (3) described below. The scattering intensity is represented by Expression (4) described below. Expressions (3) and (4) described below are theoretical formulas, and Itow in Expressions (3) and (4) is a calculated value. $I_d^{single}$ and $l_d^{floc}$ are theoretical values, and the pre-calculated values obtained in Step S14 described above can be used.

Expression (3) described below is basically the same as Expression (1), and Expression (4) described below is basically the same as Expression (2).

In Expressions (3) and (4), a superscript single of the scattering intensity I represents a scattering intensity of the single particles, and a superscript floc represents an aggregate having cross-linked and aggregated particles.

$$g^{(1)}(\tau) = \sum_{d=d_0}^{d_M} \frac{N_d^{single} I_d^{single}}{I_{total}} \exp(-D_d q^2 \tau) + \sum_{d=d_0}^{d_M} \frac{N_d^{floc} I_d^{floc}}{I_{total}} \exp(-D_d q^2 \tau) \quad (3)$$

Figure 24:
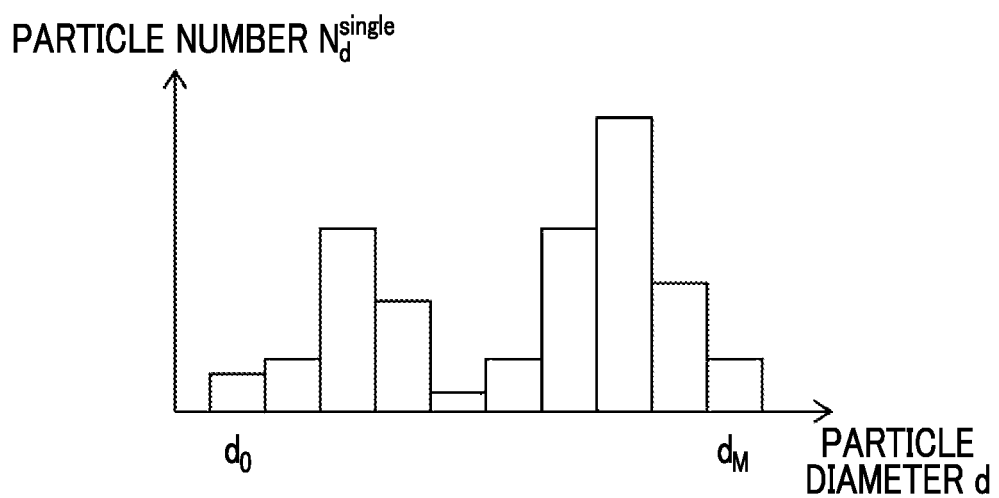
FIG. 24 is a histogram of a single particle.

In Expression (3) described above, the following term corresponds to the single particles, and corresponds to a histogram of single particles shown in FIG. 24. In the following term, $\exp(-Dq^2\tau)$ is the linear autocorrelation function, and the other portion $N_d^{single} I_d^{single}/I_{total}$ indicates a ratio of the scattering intensity of all single particles belonging to the bins of the particle diameter d to the total scattering intensity. The following term indicates a ratio of the single particles to all particles. That is, the following term is a weight of the single particles. $I_{total}$ in Expression (3) is a theoretical value that is determined by the particle diameter.

$$\frac{N_d^{single} I_d^{single}}{I_{total}} \exp(-D_d q^2 \tau)$$

Figure 25:
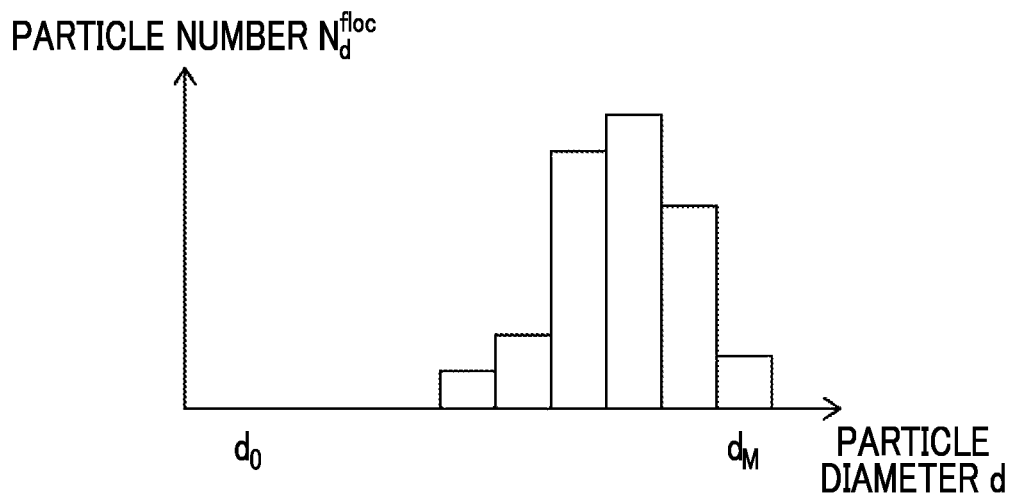
FIG. 25 is a histogram of an aggregate in which particles are aggregated.

In Expression (3) described above, the following term corresponds to an aggregate having cross-linked and aggregated particles, and corresponds to a histogram of an aggregate shown in FIG. 25. In the following term, $\exp(-Dq^2\tau)$ is the linear autocorrelation function, and the other portion $N_d^{floc} I_d^{floc}/I_{total}$ indicates a ratio of the scattering intensity of all aggregates belonging to the bins of the particle diameter d, to the total scattering intensity. That is, the following term is a weight of the aggregate.

$$\frac{N_d^{floc} I_d^{floc}}{I_{total}} \exp(-D_d q^2 \tau)$$

$$I_{total} = \sum_{d=d_0}^{d_M} N_d^{single} I_d^{single} + \sum_{d=d_0}^{d_M} N_d^{floc} I_d^{floc} \quad (4)$$

In Expression (4) described above, $N_d^{single} I_d^{single}$ corresponds to the scattering intensity of the single particles belonging to the bins of the particle diameter d, and $N_d^{floc} I_d^{floc}$ corresponds to the scattering intensity of the aggregate having cross-linked and aggregated particles belonging to the bins of the particle diameter d.

Hereinafter, the fitting for obtaining the particle size distribution of each type of particle of a plurality of types of particles will be described. In the fitting, the particle number per particle diameter is finally obtained with the particle number per particle diameter as a variable.

The linear autocorrelation function $g^{(1)}(\tau)$ is measured for each scattering angle, and there are a plurality of linear autocorrelation functions.

In the fitting, in regard to the linear autocorrelation function per scattering angle, an initial particle number is set with the particle number as a variable in Expression (3). A calculated value of the linear autocorrelation function of Expression (3) based on the set initial particle number is obtained. The linear autocorrelation function per scattering angle corresponds to the time fluctuation data derived from the scattering characteristics using the theoretical formula.

A difference between the measured value of the linear autocorrelation function and the calculated value of the linear autocorrelation function of Expression (3) is obtained for each scattering angle. The difference between the measured value of the linear autocorrelation function and the calculated value of the linear autocorrelation function of Expression (3) is referred to as a difference in linear autocorrelation function. The difference in linear autocorrelation function is obtained for each scattering angle.

The total scattering intensity $I_{total}$ is measured for each scattering angle as shown in FIG. 23. In Expression (4), a value of the total scattering intensity $I_{total}$ of Expression (4) based on the set initial particle number is obtained.

A difference between the measured value of the total scattering intensity $I_{total}$ for each scattering angle shown in FIG. 23 and the calculated value of the total scattering intensity $I_{total}$ of Expression (4) is obtained. The difference between the measured value of the total scattering intensity $I_{total}$ and the calculated value of the total scattering intensity $I_{total}$ of Expression (4) at any scattering angle is referred to as a difference in total scattering intensity $I_{total}$ at the scattering angle. In regard to the total scattering intensity $I_{total}$, the difference in total scattering intensity $I_{total}$ at the scattering angle is obtained. The calculated value of the total scattering intensity $I_{total}$ of Expression (4) corresponds to the time averaged data obtained by time averaging the derived time fluctuation data.

In the fitting, to obtain the final particle number, the difference in linear autocorrelation function obtained for each scattering angle described above and the difference in total scattering intensity at the scattering angle are used. For example, an evaluation value obtained by adding a value of the square of the difference in linear autocorrelation function obtained for each scattering angle and a value of the square of the difference in total scattering intensity at the scattering angle for all scattering angles is used. The particle number with which the evaluation value is minimized is set as the final particle number.

For this reason, in the fitting, the particle number is repeatedly updated in Expressions (3) and (4) such that the evaluation value is minimized, to obtain the final particle number. This corresponds to Step S16 described above.

In regard to the particle numbers with respect to all particle diameters, an initial value is set, and then, is updated such that the evaluation value is minimized. For example, the histogram of the single particle shown in FIG. 24 and the histogram of the aggregate having aggregated particles shown in FIG. 25 can be obtained. That is, $N_d^{single}$ and $N_d^{floc}$ are obtained for all $d=d_0$ to $d_M$, whereby the particle size distribution can be obtained. This corresponds to Step S18 described above.

The above step is a step of obtaining the particle size distribution of each type of particle of a plurality of types of particles. The evaluation value that is used for the fitting is not limited to the value described above.

As described above, Expressions (3) and (4) as two theoretical formulas are fitted to the measured linear autocorrelation function and the measured total scattering intensity $I_{total}$ to obtain the final particle number. Note that an optimization method of the fitting is not limited to the method described above, and for example, Bayesian optimization can be used for the fitting.

While the linear autocorrelation function is used in obtaining the particle number as described above, the present invention is not limited thereto, and a power spectrum may be used in place of the linear autocorrelation function.

As described above, the autocorrelation function or the power spectrum of the scattering intensity and the scattering intensity per scattering angle are fitted to the theoretical formulas, whereby the particle number and the particle size distribution of each of the single particle and the aggregate can be obtained. In a case where an impurity component is included in the dispersion liquid, since the impurity component and the particle size distribution of each type of particle can be obtained, an influence of the impurity component can be separated. For the fitting, in addition to the theoretical formulas, the time fluctuation data derived from the scattering characteristics of the known particles and the time averaged data obtained by time averaging the derived time fluctuation data may be used.

Third Example of Optical Measurement Method

A third example of the optical measurement method uses polarization. In the optical measurement device 10, a light intensity of a polarized component of scattered light of the dispersion liquid obtained by irradiating the dispersion liquid with incident light having specific polarization may be measured as a scattering intensity.

For example, the dispersion liquid Lq of the sample cell 18 is irradiated with circularly polarized laser light as incident light, and a polarized component of scattered light of the dispersion liquid Lq is measured. In regard to the light intensity of the polarized component of scattered light, for example, a difference between a light intensity of vertically linearly polarized light and a light intensity of horizontally linearly polarized light is measured as a scattering intensity. In this case, as in the first example of the above-described optical measurement method, in a case where measurement is performed while changing the scattering angle, a graph that shows a relationship between a scattering intensity and a scattering angle shown in FIG. 26 can be obtained.

Vertically linearly polarized light refers to that a direction of linearly polarized light is vertical in a case where a scattering surface is horizontal. Horizontally linearly polarized light refers to that a direction of linearly polarized light is horizontal in a case where the scattering surface is horizontal.

Figure 26:
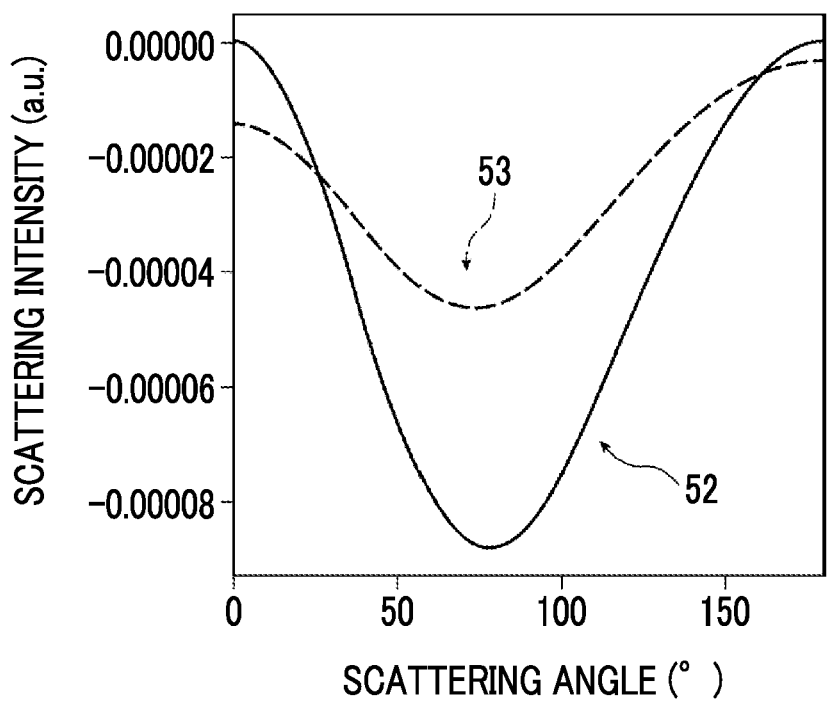
FIG. 26 is a graph showing a relationship between a scattering intensity and a scattering angle of each shape of particles.
Figure 27:
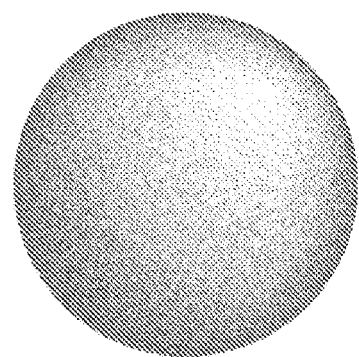
FIG. 27 is a schematic perspective view showing a spherical particle.
Figure 28:
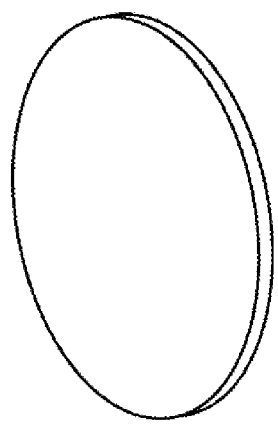
FIG. 28 is a schematic perspective view of a disc-shaped particle.

FIG. 26 is a graph showing a relationship between a scattering intensity and a scattering angle of each shape of particles. FIG. 26 shows a relationship between a scattering intensity and a scattering angle in a spherical particle shown in FIG. 27 and a disc-shaped particle shown in FIG. 28. As shown in FIG. 26, a profile 52 of a scattering intensity of the spherical particle and a profile 53 of a scattering intensity of the disc-shaped particle are different.

In this way, change of the scattering intensity with respect to the scattering angle is different depending on the shape of the particle. That is, for example, the profile of the scattering intensity obtained while changing the scattering angle is different for each type of particle of a plurality of types of particles. From the difference in the profile of the scattering intensity, a difference in shape of the particle can be determined by measuring the polarized component of scattered light using polarized laser light as incident light.

In the third example of the optical measurement method, the polarized component of scattered light is measured using polarized laser light as incident light, and the particle diameter of the particles can be calculated in the same manner as in the first example of the optical measurement method described above. In a dispersion liquid including a plurality of types of particles, a particle size distribution of each type of particle of a plurality of types of particles can be obtained.

In a case where the type of the particle in the dispersion liquid can be determined, the particle size distribution of each particle in the dispersion liquid can be obtained.

As described above, polarized light as incident light is incident on the dispersion liquid, the light intensity of the polarized component of scattered light is detected as the scattering intensity, and at least one of the scattering angle or the wavelength described above is combined. Thereby, also in regard to particles having different shapes, the particle size distribution of each type of particle of a plurality of types of particles can be obtained. In a case where an impurity component is included in the dispersion liquid, an influence of the impurity component can be separated, and then, the particle size distribution of each type of particle of a plurality of types of particles can be obtained. For the fitting, in addition to the theoretical formulas, the time fluctuation data derived from the scattering characteristics of the known particles and the time averaged data obtained by time averaging the derived time fluctuation data can be used.

The type, for example, the shape of the particles in the dispersion liquid can also be determined by the calculation unit 16 using polarized light and the difference in scattering intensity with respect to the scattering angle shown in FIG. 26. The particle size distribution of the determined particle can also be obtained. For this reason, it is preferable that data representing a relationship between polarized light and the shape of the particles is acquired in advance as information regarding the shape of the particles and is stored in the storage unit 17.

In a case where polarized light is used as described above, and for example, in a case where a plurality of wavelengths are used, Expressions (1) and (2) described above can be used.

In a case where polarized light is used as described above, and for example, in a case where a plurality of scattering angles are used, Expressions (3) and (4) described above can be used.

The first example of the optical measurement method and the second example of the optical measurement method described above may be combined. That is, the particle size distribution of each type of particle of a plurality of types of particles can also be obtained using a plurality of wavelengths and a plurality of scattering angles described above. Also in this case, in a case where an impurity component is included in the dispersion liquid, since the impurity component and the particle size distribution of each type of particle can be obtained, an influence of the impurity component can be separated.

In a plurality of types of particles, a plurality of types are aggregation structures, materials of particles, shapes of particles, and the like. A plurality of types of particles are the single particle, the aggregate in which the particles are aggregated, the spherical particle, the disc-shaped particle, and the like described above.

Second Example of Optical Measurement Device

Figure 29:
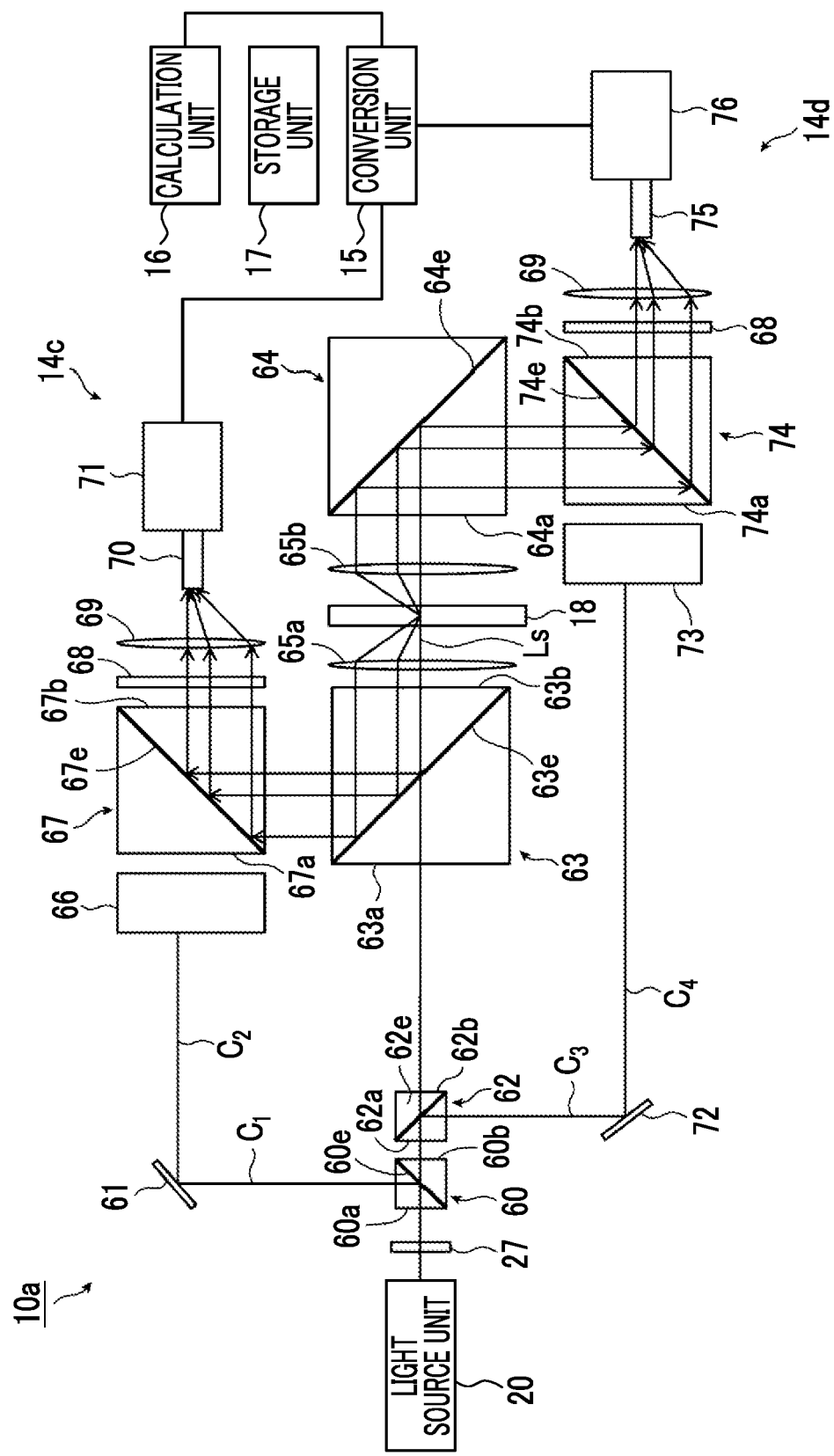
FIG. 29 is a schematic view showing a second example of an optical measurement device of the embodiment of the present invention.
Figure 30:
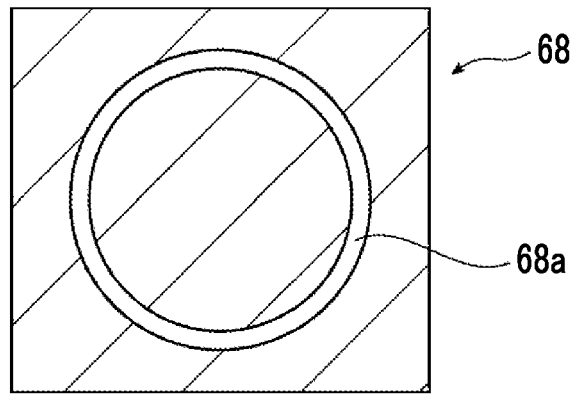
FIG. 30 is a schematic view showing a first example of a mask of the second example of an optical measurement device of the embodiment of the present invention.
Figure 31:
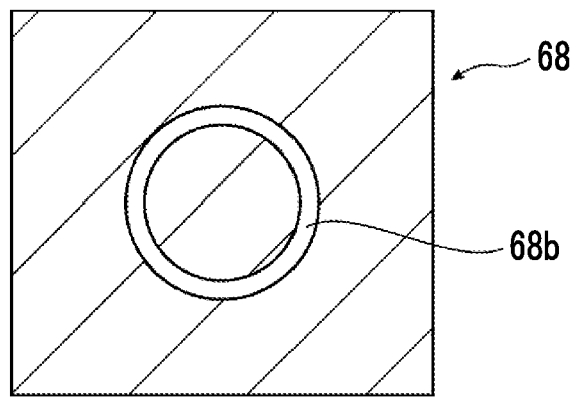
FIG. 31 is a schematic view showing a second example of a mask of the second example of an optical measurement device of the embodiment of the present invention.
Figure 32:
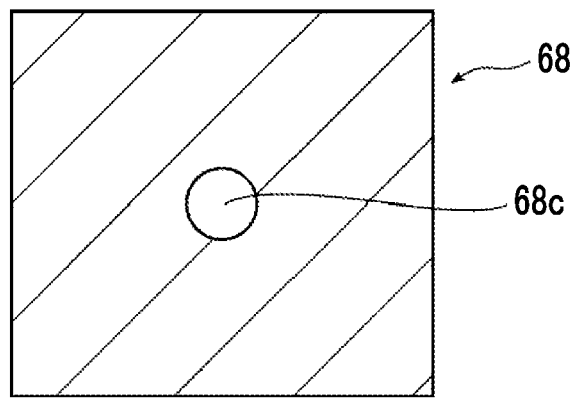
FIG. 32 is a schematic view showing a third example of a mask of the second example of an optical measurement device of the embodiment of the present invention.

FIG. 29 is a schematic view showing a second example of an optical measurement device of the embodiment of the present invention. FIGS. 30 to 32 are schematic views of a first example to a third example of a mask of the second example of an optical measurement device of the embodiment of the present invention.

In FIGS. 29 to 32, the same components as those in the optical measurement device 10 shown in FIG. 1 are represented by the same reference numerals, and detailed description thereof will not be repeated.

An optical measurement device 10a shown in FIG. 29 is different from the optical measurement device 10 shown in FIG. 1 in that disposition positions of optical elements, such as beam splitters, are different. The optical measurement device 10a comprises a detection unit 14c that detects a scattering intensity of backward scattered light for each scattering angle, and a detection unit 14d that detects a scattering intensity of forward scattered light for each scattering angle, having a configuration different from the detection unit 14 of the optical measurement device 10 shown in FIG. 1.

The optical measurement device 10a has a beam splitter 60, a beam splitter 62, and a beam splitter 63. All the beam splitter 60, the beam splitter 62, and the beam splitter 63 are regular hexahedron-shaped cube type beam splitters, and have transmitting and reflecting surfaces 60e, 62e, and 63e that split incident light into two kinds of light or multiplex two kinds of incident light, respectively. The angle of each of the transmitting and reflecting surfaces 60e, 62e, and 63e is 45°.

The beam splitter 63 is greater than the beam splitter 60 and the beam splitter 62.

The beam splitter 60, the beam splitter 62, and the beam splitter 63 are disposed in parallel. A surface 60b of the beam splitter 60 and a surface 62a of the beam splitter 62 are disposed to face each other, and a surface 62b of the beam splitter 62 and a surface 63a of the beam splitter 63 are disposed to face each other.

The transmitting and reflecting surface 60e of the beam splitter 60 and the transmitting and reflecting surface 62e of the beam splitter 62 are different in direction and are anti-parallel. The transmitting and reflecting surface 63e of the beam splitter 63 is different in direction from and is nonparallel, specially, anti-parallel with the transmitting and reflecting surface 60e of the beam splitter 60.

The light source unit 20 is disposed on the opposite side of the beam splitter 60 from the beam splitter 62 to face a surface 60a of the beam splitter 60. The spectral adjustment unit 27 is disposed between the beam splitter 60 and the light source unit 20.

The sample cell 18 is disposed on the opposite side of the beam splitter 63 from the beam splitter 62 to face a surface 63b of the beam splitter 63. An objective lens 65a is disposed between the beam splitter 63 and the sample cell 18.

A beam splitter 64 is disposed on the opposite side of the sample cell 18 from the beam splitter 63. A direction of a transmitting and reflecting surface 64e of the beam splitter 64 is the same as and is parallel with the direction of the transmitting and reflecting surface 63e of the beam splitter 63. An objective lens 65b is disposed between the sample cell 18 and the beam splitter 64.

A mirror 61 is disposed on an optical axis $C_1$ of light split by the beam splitter 60. A beam expander 66 is disposed on an optical axis $C_2$ of light reflected by the mirror 61. The beam expander 66 converts incident light into collimate light having a greater diameter than at the time of incidence and emits collimate light.

A beam splitter 67 is disposed adjacent to the beam expander 66 such that a surface 67a is directed toward the beam expander 66. The beam splitter 67 has a transmitting and reflecting surface 67e that multiplexes two kinds of incident light.

A direction of the transmitting and reflecting surface 67e of the beam splitter 67 is the same as and is parallel with the direction of the transmitting and reflecting surface 60e of the beam splitter 60.

A mask 68 is provided adjacent to an emission surface 67b of the beam splitter 67.

An objective lens 69 is disposed on the opposite side of the mask 68 from the beam splitter 67 with the mask 68 interposed therebetween.

A first photodetector 71 having an optical fiber 70, on which light condensed by the objective lens 69, is incident is disposed. The first photodetector 71 detects backward scattered light out of scattered light of the sample cell 18, and detects an intensity of interference light of backward scattered light and reference light for each scattering angle.

A mirror 72 is disposed on an optical axis $C_3$ of light split by the beam splitter 62. A beam expander 73 is disposed on an optical axis $C_4$ of light reflected by the mirror 72. The beam expander 73 converts incident light into collimate light having a greater diameter than at the time of incidence and emits collimate light.

A beam splitter 74 is disposed adjacent to the beam expander 73 such that a surface 74a is directed toward the beam expander 73. The beam splitter 74 has a transmitting and reflecting surface 74e that multiplexes two kinds of incident light.

A direction of the transmitting and reflecting surface 74e of the beam splitter 74 is the same as and is parallel with the direction of the transmitting and reflecting surface 60e of the beam splitter 60.

Here, all the beam splitter 64, the beam splitter 67, and the beam splitter 74 are regular hexahedron-shaped cube type beam splitters, and have transmitting and reflecting surfaces 64e, 67e, and 74e that split incident light into two kinds of light or multiplex two kinds of incident light, respectively. An angle of each of the transmitting and reflecting surfaces 64e, 67e, and 74e is 45°.

A mask 68 is provided adjacent to an emission surface 74b of the beam splitter 74.

An objective lens 69 is disposed on the opposite side of the mask 68 from the beam splitter 74 with the mask 68 interposed therebetween.

A second photodetector 76 having an optical fiber 75 on which light condensed by the objective lens 69 is incident, is disposed. The second photodetector 76 detects forward scattered light out of scattered light of sample cell 18, and detects an intensity of interference light of forward scattered light and reference light for each scattering angle.

The masks 68 transmit light emitted from a specific position out of light emitted from the emission surfaces 67b and 74b of the beam splitters 67 and 74. This means that light at a specific scattering angle is transmitted. The mask 68 has an opening portion according to the scattering angle. For example, in masks 68 shown in FIGS. 30 and 31, ring-shaped opening portions 68a and 68b are provided. In a mask 68 shown in FIG. 32, a circular opening portion 68c is provided in a central portion. The mask 68 shown in FIG. 32 transmits light at the scattering angle of 0° or 180°.

The mask 68 is switchable, and any of the masks 68 shown in FIGS. 30 to 32 can be used. Out of scattered light, only a specific scattering angle component is transmitted by the mask 68 and is detected by the first photodetector 71, and an optical spectrum is obtained for each scattering angle. With this, a signal of scattered light interfered is detected for each scattering angle.

A mask switching unit (not shown) in which a plurality of masks 68 are provided may be provided, and the masks 68 that are disposed between the beam splitters 67 and 74 and the objective lenses 69 may be switched to the masks 68 according to the scattering angle by the mask switching unit.

The configuration of the beam expanders 66 and 73 is not particularly limited as long as incident light can be converted into collimate light having a greater diameter than at the time of incidence and collimate light can be emitted, and a known beam expander can be suitably used. The positions where the beam expanders 66 and 73 are provided are not particularly limited to the positions shown in the drawing, and the beam expanders may be placed immediately after the light source unit 20.

In the optical measurement device 10a, light emitted from the light source unit 20 toward the sample cell 18 is split into two kinds of light by the transmitting and reflecting surface 60e of the beam splitter 60. One kind of split light is condensed by the objective lens 65a by way of the beam splitter 62 and the beam splitter 63 and is incident on the sample cell 18 as incident light Ls. In the sample cell 18, forward scattered light and backward scattered light are generated as scattered light.

Backward scattered light passes through the objective lens 65a, is reflected by the transmitting and reflecting surface 63e by way of the surface 63b of the beam splitter 63, and is incident on the beam splitter 67. Backward scattered light is further reflected by the transmitting and reflecting surface 67e of the beam splitter 67, and light at a specific scattering angle is transmitted through the mask 68, is condensed by the objective lens 69, and is incident on the optical fiber 70.

Reflection positions of backward scattered light in the transmitting and reflecting surface 63e of the beam splitter 63 and the transmitting and reflecting surface 67e of the beam splitter 67 are different depending on the scattering angle of the dispersion liquid.

On the other hand, the other kind of light between the two kinds of light split by the transmitting and reflecting surface 60e of the beam splitter 60 is reference light, is reflected by the mirror 61, is converted into collimate light having a large diameter and is emitted to the beam splitter 67 by the beam expander 66, and passes through the transmitting and reflecting surface 67e of the beam splitter 67. The other kind of light split by the beam splitter 60 passes through the opening portion 68a (see FIG. 30) of the mask 68, is condensed by the objective lens 69, and is incident on the optical fiber 70.

In this manner, backward scattered light and reference light that is the other kind of light out of the two kinds of light split by the transmitting and reflecting surface 60e of the beam splitter 60 are incident on the beam splitter 67, interfere with each other, and are detected by the first photodetector 71 by way of the optical fiber 70. With this, data of a scattering intensity of interference light at a specific scattering angle of backward scattered light is obtained. Data of the intensities of interference light at various scattering angles of backward scattered light is obtained by changing the mask 68, and in regard to backward scattered light, a plurality of pieces of data of the intensity of interference light at the specific scattering angle can be extracted. In this way, it is possible to easily measure a scattering intensity of backward scattered light at different scattering angles.

The detection unit 14c is configured with the mask 68, the objective lens 69, the optical fiber 70, and the first photodetector 71.

Forward scattered light passes through the objective lens 65b, is reflected by the transmitting and reflecting surface 64e by way of the surface 64a of the beam splitter 64, and is incident on the beam splitter 74. Forward scattered light is further reflected by the transmitting and reflecting surface 74e of the beam splitter 74, and light at a specific scattering intensity passes through the mask 68, is condensed by the objective lens 69, and is incident on the optical fiber 75.

Reflection positions of forward scattered light in the transmitting and reflecting surface 64e of the beam splitter 64 and the transmitting and reflecting surface 74e of the beam splitter 74 are different depending on the scattering angle of the dispersion liquid.

On the other hand, light split by the transmitting and reflecting surface 62e of the beam splitter 62 is reference light, is reflected by the mirror 72, is converted into collimate light having a large diameter and is emitted to the beam splitter 74 by the beam expander 73, and passes through the transmitting and reflecting surface 74e of the beam splitter 74. Light split by the beam splitter 62 passes through the opening portion 68a (see FIG. 30) of the mask 68, is condensed by the objective lens 69, and is incident on the optical fiber 75.

In this manner, forward scattered light and reference light that is light split by the transmitting and reflecting surface 60e of the beam splitter 62 are incident on the beam splitter 74, interfere with each other, and are detected by the second photodetector 76 by way of the optical fiber 75. With this, data of an intensity of interference light at a specific scattering angle of forward scattered light is obtained. Data of intensities of interference light at various scattering angles of forward scattered light is obtained by changing the mask 68, and in regard to forward scattered light, a plurality of pieces of data of the intensity of interference light at the specific scattering angle can be extracted. In this way, it is possible to easily measure a scattering intensity of forward scattered light at different scattering angles.

The detection unit 14d is configured with the mask 68, the objective lens 69, the optical fiber 75, and the second photodetector 76.

Although all the above-described beam splitters 60, 62, 63, 64, 67, and 74 regular hexahedron-shaped cube type beam splitters, the form of the beam splitter is not limited to the cube type, and may be a flat plate-shaped plate type.

The first photodetector 71 and the second photodetector 76 are not particularly limited as long as light can be detected, and for example, a photoelectric conversion element or a photomultiplier tube is used. The photoelectric conversion element is, for example, a photodiode. The first photodetector 71 and the second photodetector 76 may be single-pixel photodetectors or may be a spectral detection device (spectrometer). In a case where the first photodetector 71 and the second photodetector 76 are spectral detection devices, an interference spectrum is obtained.

With the use of data of the scattering intensity per scattering angle of forward scattered light or data of the scattering intensity per scattering angle of backward scattered light, the particle diameter of the particles included in the dispersion liquid can be obtained as described above, and the particle size distribution of each type of particle included in the dispersion liquid can also be obtained.

Also in the optical measurement device 10a, reference light may be shielded not to interfere with scattered light. In this case, reference light is shielded, whereby normal dynamic light scattering measurement can be performed. As a method of shielding reference light, for example, there is a method in which a retractable light shielding plate is provided on the optical axis $C_1$ or the optical axis $C_2$ to prevent reference light from reaching the beam expander 66.

For example, there is a method in which a retractable light shielding plate is provided on the optical axis $C_3$ or the optical axis $C_4$ to prevent reference light from reaching the beam expander 73.

The present invention is not limited to a retractable light shielding plate as long as light can be shielded, and for example, an optical shutter using a liquid crystal shutter can be used.

With the above configuration, the optical measurement device 10a can also be used as a dynamic light scattering measurement device for normal homodyne detection.

Third Example of Optical Measurement Device

Figure 33:
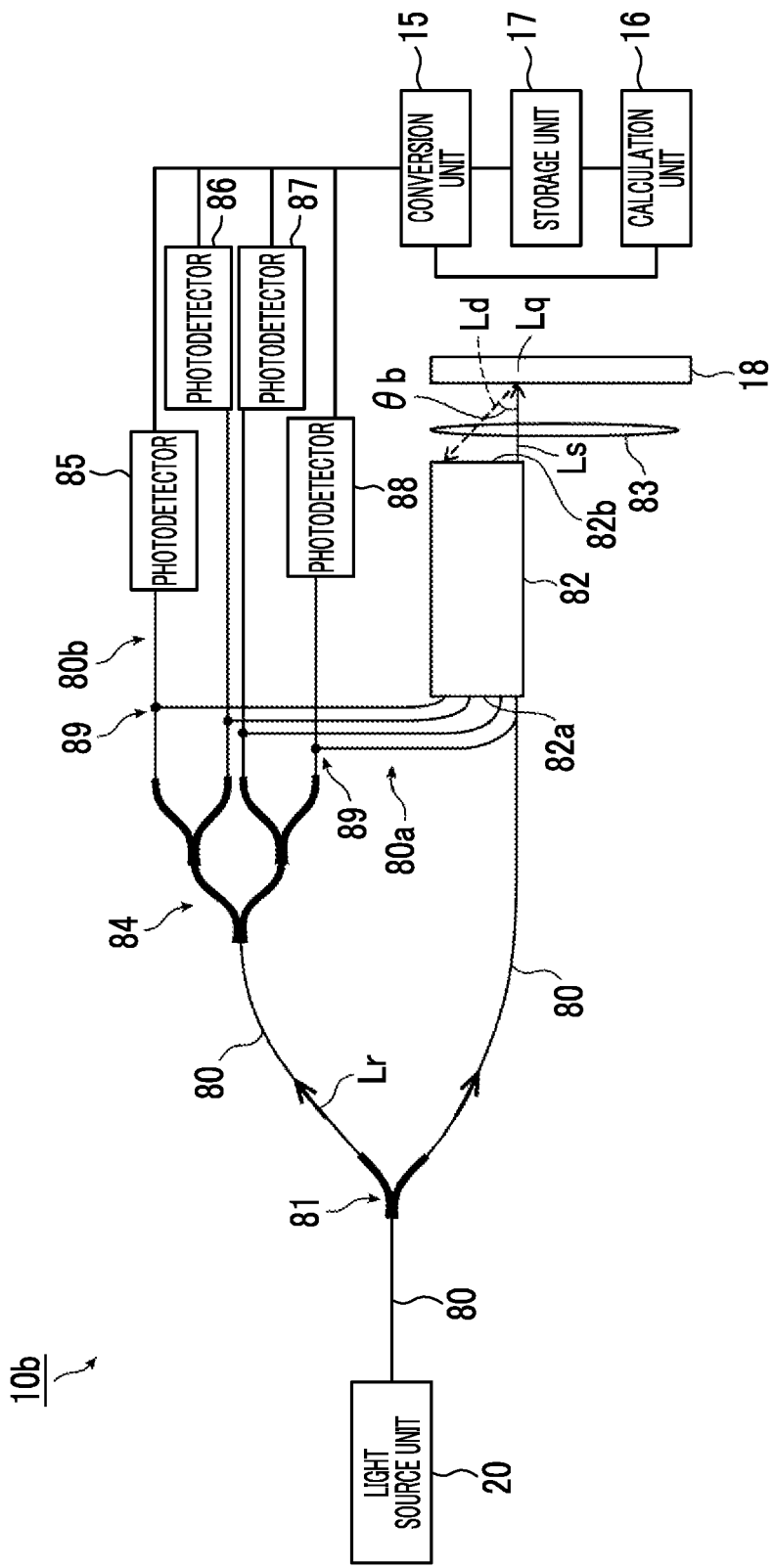
FIG. 33 is a schematic view showing a third example of an optical measurement device of the embodiment of the present invention.

FIG. 33 is a schematic view showing a third example of an optical measurement device of the embodiment of the present invention.

In FIG. 33, the same components as those in the optical measurement device 10 shown in FIG. 1 are represented by the same reference numerals, and detailed description thereof will not be repeated.

An optical measurement device 10b shown in FIG. 33 is different from the optical measurement device 10 shown in FIG. 1 in that light emitted from the light source unit 20 is made to propagate through an optical fiber 80. A plurality of photodetectors 85 to 88 are provided. A plurality of photodetectors 85 to 88 detect light at different scattering angles. The photodetectors 85 to 88 are not particularly limited as long as light can be detected, and for example, a photoelectric conversion element or a photomultiplier tube is used. The photoelectric conversion element is, for example, a photodiode. The photodetectors 85 to 88 may be spectral detection devices (spectrometer).

The optical measurement device 10b has a photocoupler 81 on which emitted light is incident from the light source unit 20.

The photocoupler 81 branches emitted light at an intensity ratio of 1:99, for example. Out of the branched light, light having a large intensity ratio is defined as incident light Ls, and light having a small intensity ratio is defined as reference light Lr.

The optical fiber 80, which extends from the photocoupler 81 and through which the incident light Ls as light having a large intensity ratio propagates, is connected to a bundle fiber 82. The bundle fiber 82 is a bundle of a plurality of optical fibers (not shown).

The sample cell 18 is disposed to face an end surface 82b of the bundle fiber 82. An objective lens 83 is disposed between the end surface 82b of the bundle fiber 82 and the sample cell 18.

Scattered light Ld scattered by the dispersion liquid Lq in the sample cell 18 is incident on the bundle fiber 82. Scattered light Ld is incident on the optical fiber at a different position among a plurality of optical fibers (not shown) of the bundle fiber 82 for each scattering angle θ and propagates through the optical fiber. For this reason, the position of the optical fiber of the bundle fiber 82 and the scattering angle can be associated with each other. With this, scattered light Ld at a different scattering angle is obtained for each optical fiber of the bundle fiber 82.

Each optical fiber of the bundle fiber 82 is connected to an optical fiber 80a in an end surface 82a.

A photocoupler 84 is connected to the optical fiber 80 through which the reference light Lr as light having a small intensity ratio out of light branched by the photocoupler 81 propagates. The photocoupler 84 branches reference light Lr according to the number of photodetectors 85, 86, 87, and 88.

The optical fiber 80a connected to each optical fiber of the bundle fiber 82 is connected to an optical fiber 80b that connects the photocoupler 84 and each of the photodetectors 85, 86, 87, and 88, using a photocoupler 89.

The configuration of the photocouplers 81, 84, and 89 is not particularly limited as long as incident light can be branched at a specific ratio or incident light can be multiplexed, and a known photocoupler can be suitably used.

The incident light Ls emitted from the light source unit 20 passes through the objective lens 83 by way of the optical fiber 80, the photocoupler 81, and the bundle fiber 82, and the dispersion liquid Lq of the sample cell 18 is irradiated with the incident light Ls. Scattered light Ld scattered by the dispersion liquid Lq in the sample cell 18 is incident on the bundle fiber 82. The scattered light Ld is incident on a different optical fiber for each scattering angle, propagates through the optical fiber 80a, and propagates through the optical fiber 80b by way of the photocoupler 89.

On the other hand, the reference light Lr propagates through the optical fiber 80b. With this, the reference light Lr and the scattered light Ld propagate through each of the photodetectors 85, 86, 87, and 88 and interfere with each other. Data of the scattering intensity of interference light per scattering angle is obtained in each of the photodetectors 85, 86, 87, and 88, and a plurality of pieces of data of the scattering intensity at the specific scattering angle can be extracted. In this way, it is possible to easily measure a scattering intensity at different scattering angles. Here, in a case where a spectrometer is used for the photodetectors 85, 86, 87, and 88, a spectrum of interference light is obtained.

With the use of data of the scattering intensity per scattering angle of the scattered light, the particle diameter of the particles included in the dispersion liquid can be obtained as described above, and the particle size distribution of each type of particle included in the dispersion liquid can also be obtained.

Also in the optical measurement device 10b, the reference light Lr may be attenuated by an attenuator not to interfere with the scattered light Ld. In this case, the reference light Lr is shielded, whereby normal dynamic light scattering measurement can be performed. As a method of shielding the reference light Lr, for example, there is a method in which an attenuator is provided in the optical fiber 80 that connects the photocoupler 81 and the photocoupler 84 to prevent the reference light Lr from reaching the photocoupler 84 with the attenuator.

The present invention is not limited to an attenuator as long as light can be shielded or attenuated.

The photocoupler 81 may have a variable branch ratio such that light is not emitted to the optical fiber 80 that connects the photocoupler 81 and the photocoupler 84.

With the above configuration, the optical measurement device 10b can also be used as a dynamic light scattering measurement device for normal homodyne detection.

The present invention is basically configured as described above. Although the optical measurement device of the present invention has been described above in detail, the present invention is not limited to the above-described embodiment, and various improvements or alterations may be of course made without departing the spirit and scope of the present invention.

EXPLANATION OF REFERENCES 10, 10a, 10b: optical measurement device
12: low-coherence interferometer
14: detection unit
14a: first detection unit
14b: second detection unit
14c, 14d: detection unit
15: conversion unit
16: calculation unit
17: storage unit
18: sample cell
20: light source unit
21a, 21b, 21c, 21d, 39: beam splitter
21e, 39e, 60e, 62e, 63e, 64e, 67e, 74e: transmitting and reflecting surface
22: reflector
22a: reflecting surface
23a: dispersion compensation adjustment unit
23b, 25: objective lens
24a, 24b: ND filter
26: polarization adjustment unit
27: spectral adjustment unit
28: polarization control unit
33, 34: photodetector
30, 61, 72: mirror
32: diffraction grating
35a: wavelength range
35b: depth-of-interest region
36, 37: profile
38: optical device
39a, 39b: surface
40, 42: angle-of-interest region
41, 43: profile
60, 62, 63, 64, 67, 74: beam splitter
63b, 64a: surface
65a, 65b, 69, 83: objective lens
66, 73: beam expander
67b: emission surface
68: mask
68a, 68b, 68c: opening portion
70, 75, 80, 80a, 80b: optical fiber
71: first photodetector
74b: emission surface
76: second photodetector
81, 84, 89: photocoupler
82: bundle fiber
82a, 82b: end surface
85, 86, 87, 88: photodetector
$C_1, C_2, C_3, C_4$: optical axis
Lr: reference light
Ld: scattered light
Lq: dispersion liquid
Ls: incident light
$\theta b$: scattering angle

What is claimed is:

1. An optical measurement device with a low-coherence interferometer comprising:
    a detection unit having a first detection unit and a second detection unit,
    wherein the first detection unit detects an interference light intensity per wavelength by means of interference between at least a part of scattered light obtained by allowing incident light to be incident on a dispersion liquid including particles and reference light, and
    the second detection unit detects an interference light intensity per scattering angle by means of interference between at least a part of the scattered light obtained by allowing the incident light to be incident on the dispersion liquid including the particles and the reference light;
    a processor being configured to extract a plurality of pieces of data of a scattering intensity at a specific depth and a specific wavelength of the dispersion liquid from data of the interference light intensity per wavelength detected by the first detection unit or a plurality of pieces of data of a scattering intensity at a specific depth and a specific scattering angle of the dispersion liquid from data of the interference light intensity per scattering angle detected by the second detection unit and converts the extracted data of the scattering intensity into time fluctuation data of the scattered light at the specific depth of the dispersion liquid; and
    a storage medium that stores at least one of scattering angle-dependent data regarding a scattered light intensity of known particles, which is obtained by a complex refractive index, a particle diameter, and a shape of the known particles, or wavelength-dependent data regarding the scattered light intensity; and
    the processor that obtains a particle size distribution of each type of particle included in the dispersion liquid by fitting scattering angle-dependent data obtained from the time fluctuation data acquired by the processor or wavelength-dependent data of the scattered light obtained from the time fluctuation data acquired by the processor with respect to the scattering angle-dependent data regarding the scattered light intensity or the wavelength-dependent data regarding the scattered light intensity of the known particles stored in the storage medium.

2. The optical measurement device according to claim 1, wherein
    the processor is further configured to calculate a particle diameter of the particles using the time fluctuation data acquired by the processor.

3. The optical measurement device according to claim 1, wherein
    the processor is further configured to obtain a particle size distribution of each type of particle included in the dispersion liquid by fitting the time fluctuation data acquired by the processor and time averaged data obtained by time averaging the time fluctuation data acquired by the processor with respect to a theoretical formula that defines a relationship between a particle diameter and a scattering intensity.

4. An optical measurement device with a low-coherence interferometer comprising:
    a detection unit having a first detection unit and a second detection unit,
    wherein the first detection unit detects an interference light intensity per wavelength by means of interference between at least a part of scattered light obtained by allowing incident light to be incident on a dispersion liquid including particles and reference light, and
    the second detection unit detects an interference light intensity per scattering angle by means of interference between at least a part of the scattered light obtained by allowing the incident light to be incident on the dispersion liquid including the particles and the reference light;
    processor being configured to extract a plurality of pieces of data of a scattering intensity at a specific depth and a specific wavelength of the dispersion liquid from data of the interference light intensity per wavelength detected by the first detection unit or a plurality of pieces of data of a scattering intensity at a specific depth and a specific scattering angle of the dispersion liquid from data of the interference light intensity per scattering angle detected by the second detection unit and converts the extracted data of the scattering intensity into time fluctuation data of the scattered light at the specific depth of the dispersion liquid;

a storage medium that stores at least one of scattering angle-dependent data regarding a scattered light intensity of known particles, which is obtained by a complex refractive index, a particle diameter, and a shape of the known particles, or wavelength-dependent data regarding the scattered light intensity; and the processor that determines at least one of a type of particle of the particles in the dispersion liquid or a state of the particles in the dispersion liquid using the scattering angle-dependent data regarding the scattered light intensity or the wavelength-dependent data regarding the scattered light intensity of the known particles stored in the storage medium.

5. The optical measurement device according to claim 1, wherein the first detection unit has a photodetector that wavelength-resolves the scattered light that has interfered with the reference light and detects the wavelength-resolved scattered light for each wavelength.

6. The optical measurement device according to claim 1, wherein the second detection unit has a photodetector that detects the scattered light that has interfered with the reference light for each scattering angle.

7. The optical measurement device according to claim 1, further comprising:

a polarizer that controls a polarization state of the incident light, wherein the first detection unit or the second detection unit measures a light intensity of a polarized component of the scattered light as the scattering intensity.

8. The optical measurement device according to claim 1, further comprising:

a band-pass filter that controls a center wavelength and a wavelength range of the incident light.

9. The optical measurement device according to claim 1, wherein the time fluctuation data of the scattered light is a power spectrum or an autocorrelation function.

10. The optical measurement device according to claim 2, wherein the first detection unit has a photodetector that wavelength-resolves the scattered light that has interfered with the reference light and detects the wavelength-resolved scattered light for each wavelength.

11. The optical measurement device according to claim 2, wherein the second detection unit has a photodetector that detects the scattered light that has interfered with the reference light for each scattering angle.

12. The optical measurement device according to claim 2, further comprising:

a polarizer that controls a polarization state of the incident light, wherein the first detection unit or the second detection unit measures a light intensity of a polarized component of the scattered light as the scattering intensity.

13. The optical measurement device according to claim 2, further comprising:

a band-pass filter that controls a center wavelength and a wavelength range of the incident light.

14. The optical measurement device according to claim 2, wherein the time fluctuation data of the scattered light is a power spectrum or an autocorrelation function.

15. The optical measurement device according to claim 3, wherein the first detection unit has a photodetector that wavelength-resolves the scattered light that has interfered with the reference light and detects the wavelength-resolved scattered light for each wavelength.

16. The optical measurement device according to claim 3, wherein the second detection unit has a photodetector that detects the scattered light that has interfered with the reference light for each scattering angle.

17. The optical measurement device according to claim 3, further comprising:

a polarizer that controls a polarization state of the incident light, wherein the first detection unit or the second detection unit measures a light intensity of a polarized component of the scattered light as the scattering intensity.

18. The optical measurement device according to claim 3, further comprising:

a band-pass filter that controls a center wavelength and a wavelength range of the incident light.

19. The optical measurement device according to claim 3, wherein the time fluctuation data of the scattered light is a power spectrum or an autocorrelation function.

\* \* \* \* \*